US010941050B2

(12) United States Patent
Faaborg et al.

(10) Patent No.: US 10,941,050 B2
(45) Date of Patent: Mar. 9, 2021

(54) MODULAR UNDERDRAIN SYSTEMS

(71) Applicant: WesTech Engineering, Inc., Salt Lake City, UT (US)

(72) Inventors: Rand S Faaborg, Radcliffe, IA (US); Clifford Dale Barber, Nevada, IA (US); Darrell Wayne Christianson, Boone, IA (US); Brian Leo Brink, Ames, IA (US); Scott Allen Pallwitz, Pleasant Hill, IA (US); Chad Allen Carpenter, Madrid, IA (US)

(73) Assignee: WesTech Engineering, Inc., Salt Lake City, UT (US)

( * ) Notice: Subject to any disclaimer, the term of this patent is extended or adjusted under 35 U.S.C. 154(b) by 62 days.

(21) Appl. No.: 16/355,655

(22) Filed: Mar. 15, 2019

(65) Prior Publication Data

US 2020/0290891 A1 Sep. 17, 2020

(51) Int. Cl.
*B01D 24/24* (2006.01)
*B01D 24/46* (2006.01)
(Continued)

(52) U.S. Cl.
CPC .............. *C02F 1/004* (2013.01); *B01D 24/24* (2013.01); *B01D 24/4636* (2013.01);
(Continued)

(58) Field of Classification Search
CPC ........ B01D 24/12; B01D 24/22; B01D 24/24; B01D 24/4631; B01D 24/4636;
(Continued)

(56) References Cited

U.S. PATENT DOCUMENTS 5,976,370 A 11/1999 Medworth
6,090,284 A 7/2000 Melber
(Continued)

FOREIGN PATENT DOCUMENTS

CH 351578 A * 1/1961 ......... B01D 24/4626

OTHER PUBLICATIONS

Westech Engineering, Inc., Granular Media Filter Parts Underdrains, Troughs, and the MULTIWASH® Process, online brochure, apparently published on or before Dec. 31, 2013 [retrieved from the Internet on Apr. 8, 2019 from <URL: https://cdn2.hubspot.net/hubfs/541513/Brochures/Brochure-Granular-Media-Filter-Parts.pdf>] (shown in attachment 1).

(Continued)

*Primary Examiner* — Matthew O Savage
(74) *Attorney, Agent, or Firm* — Austin Rapp

(57) ABSTRACT

A modular underdrain system is disclosed. The modular underdrain system may comprise an intermediate modular component having a first peripheral side including a first mating portion and a second peripheral side including a second mating portion. The second mating portion may be sized and shaped to engage with a first mating portion of an adjacent modular component. A modular component chamber may be bounded by an underdrain floor side and an internal side. The underdrain floor side may comprise a plurality of slots. The metering pipe is sized to be positioned within a metering pipe opening in the internal side with a distributor head positioned within the modular component chamber. The metering pipe may comprise a set of one or more remote orifices and a set of one or more proximate orifices.

19 Claims, 20 Drawing Sheets

(51) Int. Cl.
　　　*C02F 1/00*　　　(2006.01)
　　　*B01D 29/56*　　(2006.01)
　　　*B01D 24/12*　　(2006.01)
(52) U.S. Cl.
　　　CPC .............. *B01D 29/56* (2013.01); *B01D 24/12* (2013.01); *B01D 2201/30* (2013.01); *C02F 2201/007* (2013.01)
(58) Field of Classification Search
　　　CPC ..... B01D 29/56; B01D 2201/30; C02F 1/004; C02F 2201/007
　　　USPC ......................................... 210/274, 275, 293
　　　See application file for complete search history.

(56) References Cited

U.S. PATENT DOCUMENTS

| | | | |
|---|---|---|---|
| 6,569,328 | B1 | 5/2003 | Haggard |
| 6,991,726 | B2 | 1/2006 | St. Germain |

OTHER PUBLICATIONS

Westech Engineering, Inc., MULTIBLOCK® Filter Underdrain, web page [online], apparently published on or before Mar. 23, 2015 [retrieved from the Internet on Jun. 19, 2019 from <URL: https://web.archive.org/web/20150323211930/http://www.westech-inc.com/en-usa/products/filter-underdrain-multiblock>] (shown in attachment 2).

Westech Engineering, Inc., Multicrete II Filter Underdrain, web page [online], apparently published on or before Mar. 23, 2015 [retrieved from the Internet on Jun. 19, 2019 from <URL: https://web.archive.org/web/20150323151052/http://www.westech-inc.com/en-usa/products/filter-underdrain-multicrete-ii>] (shown in attachment 4).

Roberts Filter Group, Trilateral® SST—Stainless Steel Underdrain, web page [online], apparently published on or before Dec. 31, 2018 [retrieved from the Internet on Jun. 10, 2019 from <URL: http://www.robertsfilter.com/trilateral-sst/>] (shown in attachment 5).

Tonka Water, Bleu Underdrain Low Profile Stainless Steel Dual Parallel Underdrain, online brochure, apparently published on or before Dec. 31, 2018 [retrieved from the Internet on Apr. 8, 2019 from <URL: https://www.tonkawater.com/wp-content/uploads/2017/12/TonkaWater_BLEU_Brochure.pdf>] (shown in attachment 6).

Anthratech Western Inc., Optimize your filter system We've got it covered with the AWI Phoenix Underdrain System, online brochure, apparently published on or before Jul. 31, 2016 [retrieved from the Internet on Jun. 19, 2019 from <URL: https://web.archive.org/web/20160731054906/http://awifilter.com/uploads/File/Phoenix%20Underdrain%20Brochure.pdf>] (shown in attachment 7).

Anthratech Western Inc., Phoenix Underdrain System, web page [online], apparently published on or before Dec. 31, 2006 [retrieved from the Internet on Jun. 10, 2019 from <URL: http://www.awifilter.com/index.php?page=cssmenu_horizontal>] (shown in attachment 8).

Ovivo, Filter Underdrains Product Profile, online brochure, apparently published on or before Feb. 10, 2016 [retrieved from the Internet on Jun. 19, 2019 from <URL: https://web.archive.org/web/20160210175409/http://www.ovivowater.com/wp-content/uploads/2015/06/228_P_BR_1.PDF>] (shown in attachment 9).

Ovivo, Enviroquip® Folded Plate Filter Underdrain, web page [online], apparently published on or before Feb. 2, 2016 [retrieved from the Internet on Jun. 19, 2019 from <URL: https://web.archive.org/web/20160202202524/http://www.ovivowater.com/product/municipal/municipal-drinking-water/filtration-2/gravity-filtration/enviroquip-folded-plate-filter-underdrain/>] (shown in attachment 10).

Ovivo, Stainless Steel Filter Underdrain for Uniform Air + Water Backwash, online brochure, apparently published on or before Feb. 10, 2016 [retrieved from the Internet on Jun. 19, 2019 from <URL: https://web.archive.org/web/20160210175518/http://www.ovivowater.com/wp-content/uploads/2015/06/85_P_BR_1.PDF>] (shown in attachment 11).

Ovivo, Flexscour® Underdrain, web page [online], apparently published on or before Feb. 2, 2016 [retrieved from the Internet on Jun. 19, 2019 from <URL: https://web.archive.org/web/20160202202913/http://www.ovivowatercom/product/municipal/municipal-drinking-water/filtration-2/gravity-filtration/flexscour-underdrain/>] (shown in attachment 12).

Aqseptence Group, Johnson Screens Triton Underdrain System, web page [online], apparently published on or before Dec. 31, 2017 [retrieved from the Internet on Jun. 10, 2019 from <URL: https://www.aqseptence.com/app/en/products/johnson-screens-triton-underdrain-system/>] (shown in attachment 13).

Xylem, I.M.S.® 200 and I.M.S® 1000, online brochure, apparently published on or before Dec. 31, 2012 [retrieved from the Internet on Apr. 8, 2019 from <URL: https://www.xylem.com/siteassets/brand-specific-content-including-catalog/leopold/leopold-resources/1145_leopold_ims_200_1000_final.pdf>] (shown in attachment 14).

Xylem, Gravity Media Filtration Systems, web page [online], apparently published on or before Jan. 28, 2019 retrieved from the Internet on Apr. 8, 2019 from <URL: https://web.archive.org/web/20190128233752/https://www.xylem.com/en-us/products-services/treatment-products-systems/filtration/gravity-media-filtration-systems/>] (shown in attachment 15).

Xylem, I.M.S® 1000 media retainer, web page [online], apparently published on or before Feb. 6, 2019 [retrieved rom the Internet on Apr. 8, 2019 from <URL: https://www.xylem.com/en-us/products-services/treatment-products-systems/filtration/gravity-media-filtration-systems/i.m.s-1000-media-retainer>] (shown in attachment 16).

Xylem, I.M.S® 200 and I.M.S® 1000, brochure, apparently published on or before Dec. 31, 2012 (shown in attachment 17).

Westech Engineering, Inc., Granular Media Filter Parts Underdrains, Troughs, and the Multiwash® Process, online brochure, apparently published on or before Dec. 31, 2013 [retrieved from the Internet on Apr. 8, 2019 from <URL: https://cdn2.hubspot.net/hubfs/541513/Brochures/Brochure-Granular-Media-Filter-Parts.pdf>].

Westech Engineering, Inc., Multiblock® Filter Underdrain, web page [online], apparently published on or before Mar. 23, 2015 [retrieved from the Internet on Jun. 19, 2019 from <URL: https://web.archive.org/web/20150323211930/http://www.westech-inc.com/en-usa/productsifilter-underdrain-multiblock>].

Westech Engineering, Inc., Multiblock® Underdrain with optional Laser Shield media-retaining system sold or offered for sale on or before Jun. 1, 2000.

Westech Engineering, Inc., PyraMed Underdrain sold or offered for sale at least by Jan. 1, 2004.

Westech Engineering, Inc., Multicrete II Filter Underdrain, web page [online], apparently published on or before Mar. 23, 2015 [retrieved from the Internet on Jun. 19, 2019 from <URL: https://web.archive.org/web/20150323151052/http://www.westech-inc.com/en-usa/productsifilter-underdrain-multicrete-ii>].

Westech Engineering, Inc., Multicrete II Filter Underdrain sold or offered for sale on or before Jan. 1, 1986.

Roberts Filter Group, Trilateral® SST—Stainless Steel Underdrain, web page [online], apparently published on or before Dec. 31, 2018 [retrieved from the Internet on Jun. 10, 2019 from <URL: http://www.robertsfilter.com/trilateral-sstl>].

Roberts Filter Group, Trilateral® SST—Stainless Steel Underdrain apparently sold or offered for sale on or before Jan. 1, 2014.

Tonka Water, Bleu Underdrain Low Profile Stainless Steel Dual Parallel Underdrain, online brochure, apparently published on or before Dec. 31, 2018 [retrieved from the Internet on Apr. 8, 2019 from <URL: https:// Nww.tonkawater.com/wp-content/uploads/2017/12/TonkaWater_BLEU_Brochure.pdf>] .

Tonka Water, Bleu Underdrain System apparently sold or offered for sale on or before Jan. 1, 2014.

Anthratech Western Inc., Optimize your filter system We've got it covered with the AWI Phoenix Underdrain System, online brochure, apparently published on or before Jul. 31, 2016 [retrieved from the Internet on Jun. 19, 2019 from <URL: https://web.archive.org/web/20160731054906/http://awifilter.com/uploads/File/Phoenix%20Underdrain%20Brochure.pdf>].

(56) References Cited

OTHER PUBLICATIONS

Anthratech Western Inc., Phoenix Underdrain System, web page [online], apparently published on or before Dec. 31, 2006 [retrieved from the Internet on Jun. 10, 2019 from <URL: http://www.awifilter.com/index.php?page=cssmenu_horizontal>].

Anthratech Western Inc., AWI Phoenix Underdrain System apparently sold or offered for sale on or before Jan. 1, 2005.

Ovivo, Filter Underdrains Product Profile, online brochure, apparently published on or before Feb. 10, 2016 [retrieved from the Internet on Jun. 19, 2019 from <URL: https://web.archive.org/web/20160210175409/http://www.ovivowater.com/wp-content/uploads/2015/06/228_P_BR_1_PDF>].

Ovivo, Enviroquip® Folded Plate Filter Underdrain, web page [online], apparently published on or before Feb. 2, 2016 [retrieved from the Internet on Jun. 19, 2019 from <URL: https://web.archive.org/web/20160202202524/http:// www.ovivowatercom/product/municipal/municipal-drinking-water/filtration-2/gravity-filtration/enviroquip-folded-plate-filter-underdrain/>].

Ovivo, Enviroquip® Folded Plate Filter Underdrain apparently sold or offered for sale on or before Jan. 1, 1999.

Ovivo, Stainless Steel Filter Underdrain for Uniform Air + Water Backwash, online brochure, apparently published on or before Feb. 10, 2016 [retrieved from the Internet on Jun. 19, 2019 from <URL: https://web.archive.org/web/20160210175518/http://www.ovivowater.com/wp-content/uploads/2015/06/85_P_BR_1_PDF>].

Ovivo, Flexscour® Underdrain, web page [online], apparently published on or before Feb. 2, 2016 [retrieved from the Internet on Jun. 19, 2019 from <URL: https://web.archive.org/web/20160202202913/http://www.ovivowater.com/product/municipal/municipal-drinking-waterifiltration-2/gravity-filtration/flexscour-underdrain/>].

Ovivo, Flexscour® Underdrain apparently sold or offered for sale on or before Jan. 1, 2005.

Aqseptence Group, Johnson Screens Triton Underdrain System, web page [online], apparently published on or before Dec. 31, 2017 [retrieved from the Internet on Jun. 10, 2019 from <URL: https://www.aqseptence.com/app/en/products/johnson-screens-triton-underdrain-system/>].

Aqseptence Group, Johnson Screens Triton Underdrain System apparently sold or offered for sale on or before Jan. 1, 1997.

Xylem, I.M.S® 200 and I.M.S® 1000, online brochure, apparently published on or before Dec. 31, 2012 [retrieved from the Internet on Apr. 8, 2019 from <URL: https://www.xylem.comisiteassets/brand-specific-content-including-catalogileopoldileopold-resources/1145_leopold_ims_200_1000_finatpdf>].

Xylem, Gravity Media Filtration Systems, web page [online], apparently published on or before Jan. 28, 2019 [retrieved from the Internet on Apr. 8, 2019 from <URL: https://web.archive.org/web/20190128233752/https://www. Xylem.com/en-us/products-services/treatment-products-systems/filtration/gravity-media-filtration-systems/>].

Xylem, I.M.S.® 1000 media retainer, web page [online], apparently published on or before Feb. 6, 2019 [retrieved from the Internet on Apr. 8, 2019 from <URL: https://www.xylem.com/en-us/products-services/treatment-products-systems/filtiltration/gravity-media-filtration-systems/i.m.s-1000-media-retainer>].

Xylem, I.M.S.® and I.M.S® 1000, brochure, apparently published on or before Dec. 31, 2012.

Xylem, I.M.S.® 1000 apparently sold or offered for sale on or before Jan. 1, 2017.

Xylem, I.M.S.® 200 apparently sold or offered for sale on or before Jan. 1, 2017.

\* cited by examiner

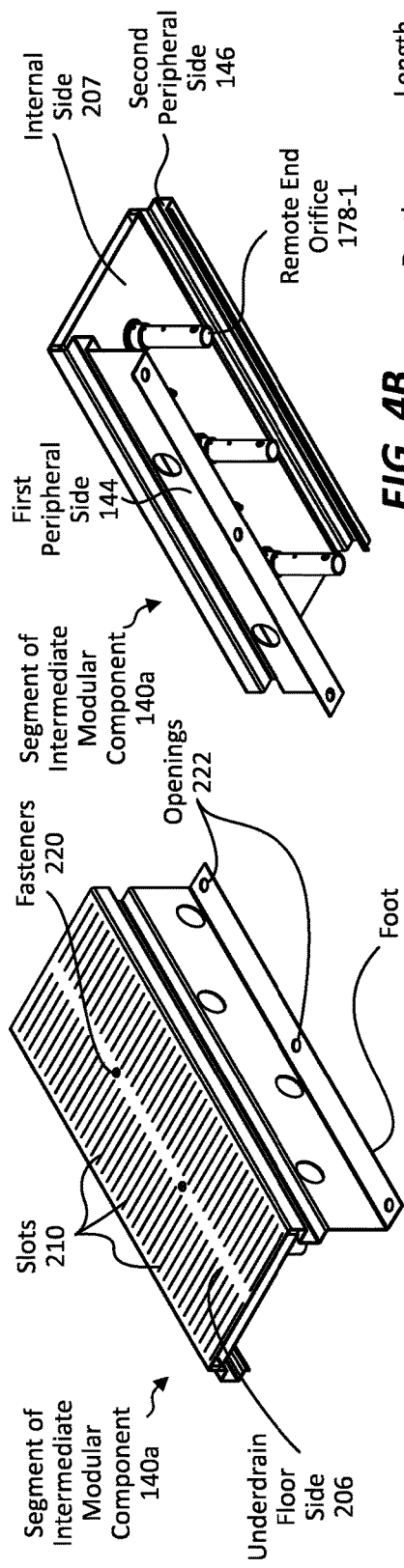
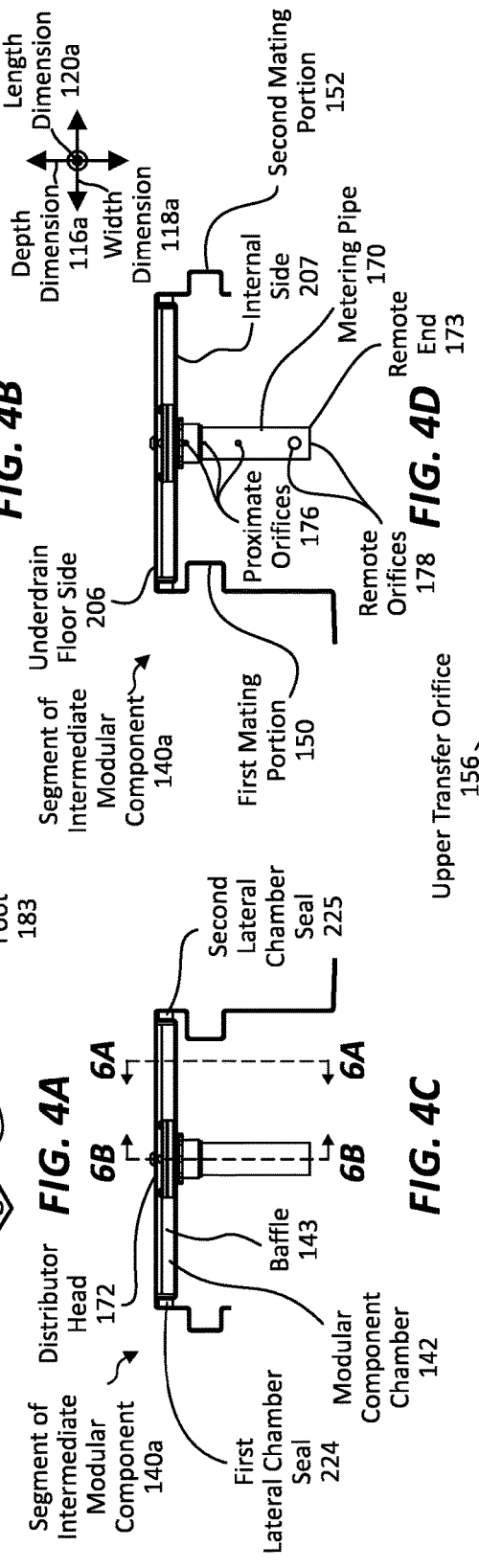
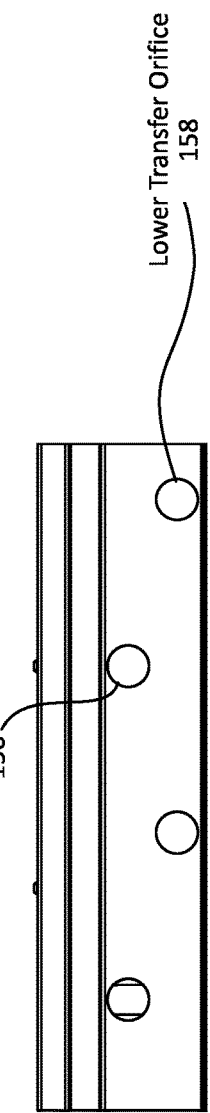
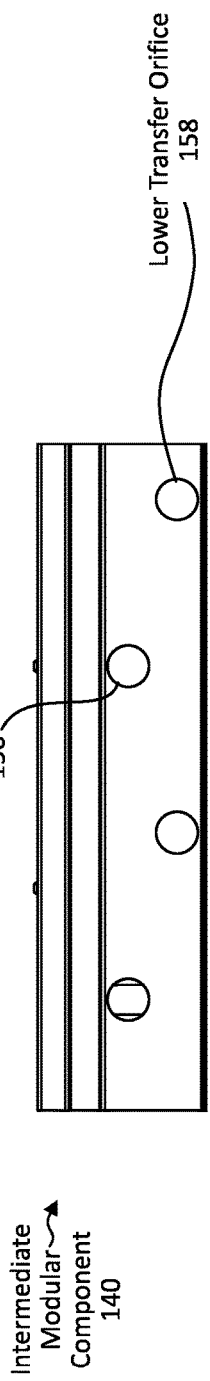
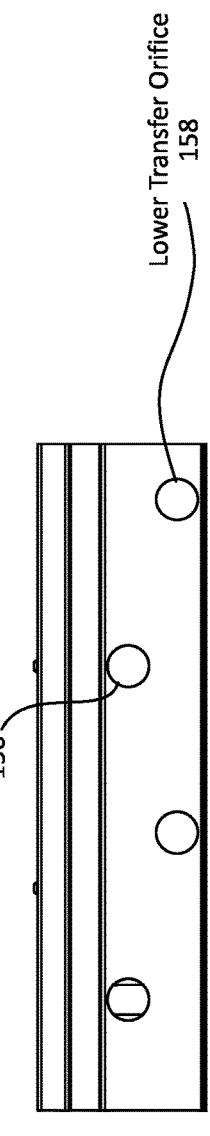

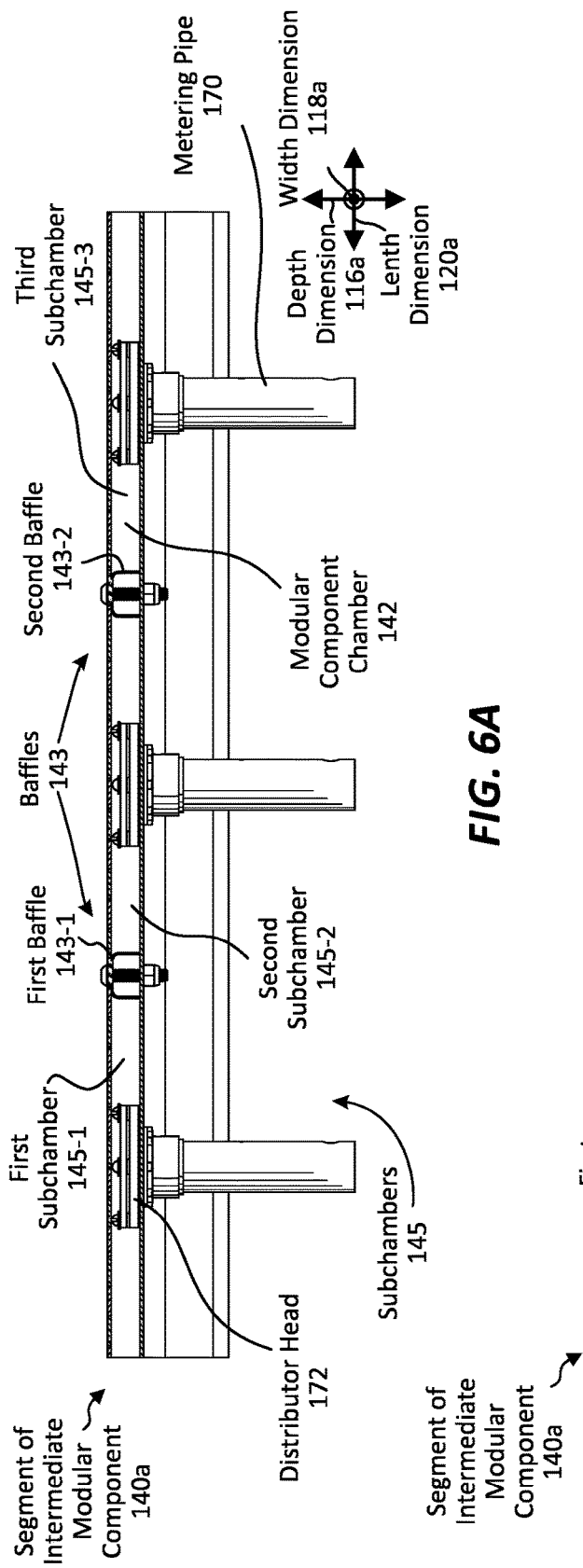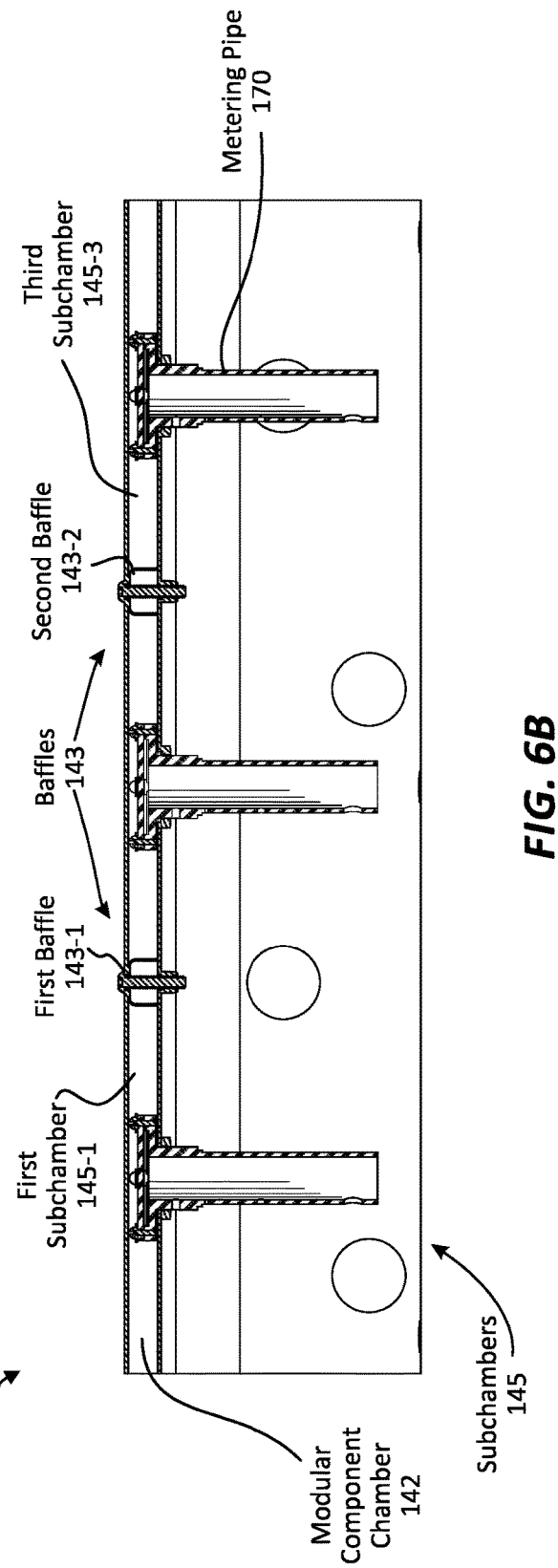

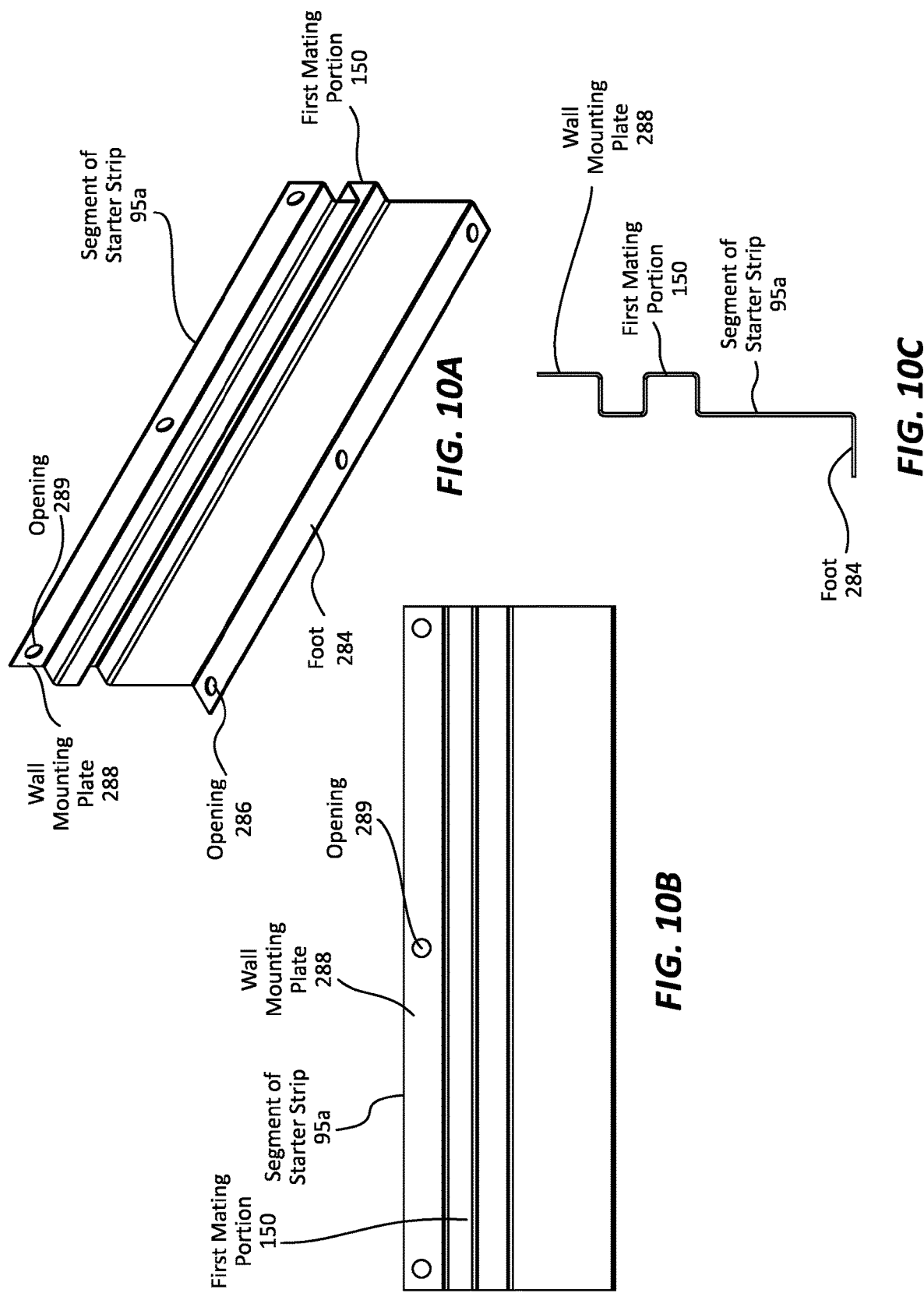

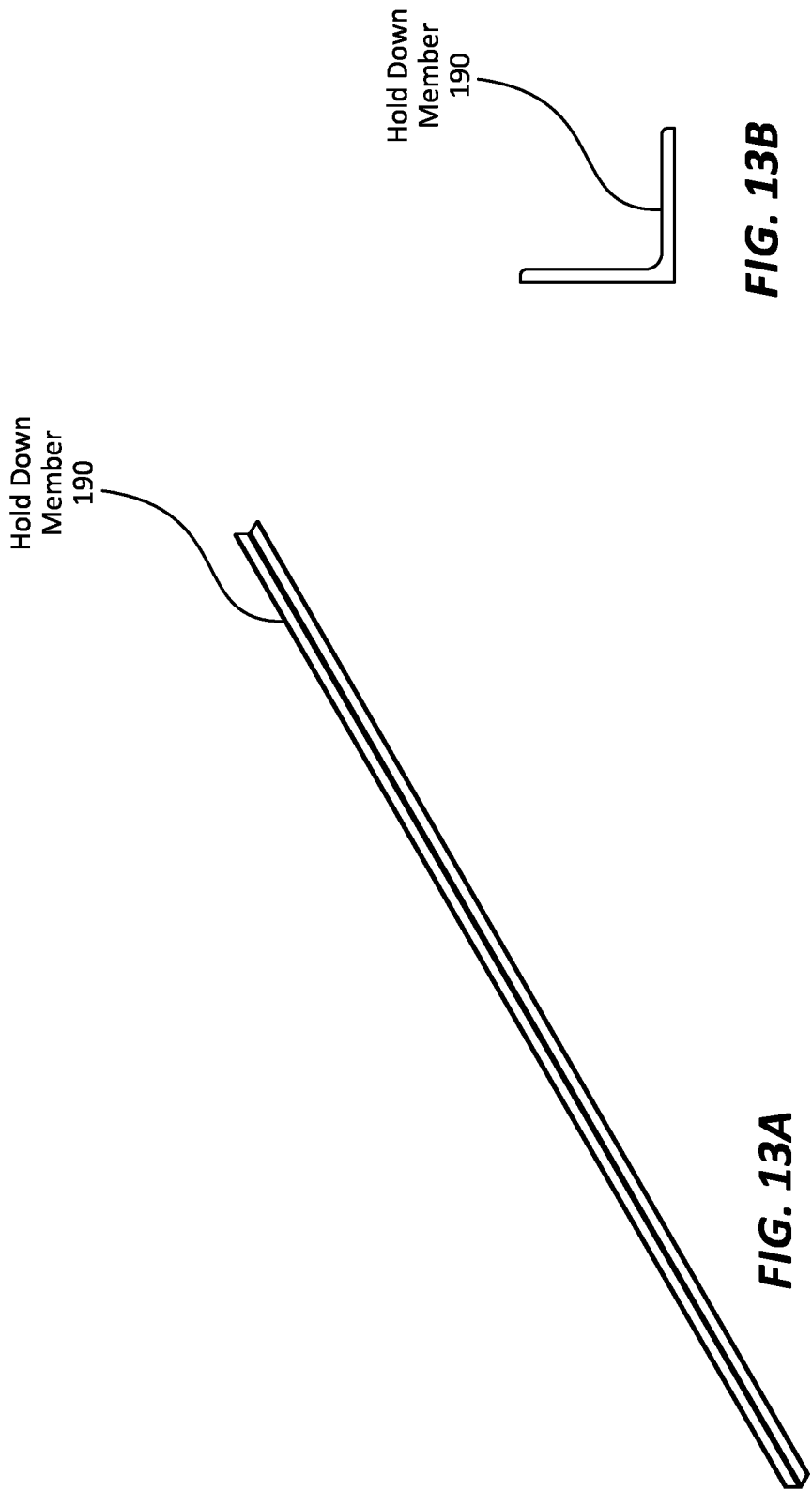

MODULAR UNDERDRAIN SYSTEMS

TECHNICAL FIELD

The present invention relates to underdrain systems for use in filtration systems.

BACKGROUND

Underdrain systems for use in filtration systems are difficult to construct. Further, it is challenging to formulate an underdrain system that achieves proper water flow during the filtering state and/or proper water flow and airflow during a cleaning state. Accordingly, an improved underdrain system is desirable to overcome one or more of the foregoing challenges.

SUMMARY

Embodiments of the disclosed subject matter are provided below for illustrative purposes and are in no way limiting of the claimed subject matter.

Various embodiments of a modular underdrain system for use in a filter cell for filtering water are disclosed. The filter cell may comprise a filter chamber including filter media separated from an underdrain chamber by the modular underdrain system. The filter cell may further comprise a water injection mechanism for inputting water to be filtered into the filter chamber and water and air injection mechanisms for inputting cleaning water and air into the underdrain chamber. The modular underdrain system may comprise a plurality of modular components with each of the plurality of modular components comprising a depth dimension, a width dimension, and a length dimension with at least one of the plurality of modular components comprising an intermediate modular component.

One of the intermediate modular components may comprise a first peripheral side and a second peripheral side. The first peripheral side may be opposite the second peripheral side along the width dimension. The first peripheral side may comprise a first mating portion, and the second peripheral side may comprise a second mating portion. The second mating portion may be sized and shaped to engage with a first mating portion of an adjacent modular component. The first peripheral side may comprise at least one transfer orifice.

The intermediate modular component may comprise a modular component chamber bounded by an underdrain floor side and an internal side with the underdrain floor side being offset from at least a portion of the internal side along the depth dimension. The underdrain floor side may comprise a plurality of slots, and the internal side may comprise a metering pipe opening.

The intermediate modular component may also comprise a metering pipe sized to be positioned within the metering pipe opening. The metering pipe opening may comprise a distributor head for positioning within the modular component chamber and an outside portion for positioning outside of the modular component chamber. The outside portion of the metering pipe may comprise a set of one or more proximate orifices and a set of one or more remote orifices with the set of one or more proximate orifices being disposed closer to the modular component chamber along the depth dimension than the set of one or more remote orifices.

The at least one transfer orifice may comprise a first transfer orifice and a second transfer orifice with the first transfer orifice and the second transfer orifice being offset along the depth dimension.

The modular component chamber may comprise a first subchamber separated by a baffle from a second subchamber with the baffle limiting fluid flow between the first subchamber and the second subchamber. The intermediate modular component may further comprise a second metering pipe disposed at least partially within the second subchamber, the metering pipe being at least partially disposed within the first subchamber. The intermediate modular component may further comprise a second baffle spaced apart from the baffle along the length dimension of the intermediate modular component.

In various embodiments, when the modular underdrain system is in an installed state, the modular component chamber has a modular component chamber cross-sectional area bounded by the internal side and the underdrain floor side, and the intermediate modular component has an underdrain chamber cross-sectional area bounded by the internal side, the first peripheral side, a substrate to which the first peripheral side is attached, the second peripheral side, and a first peripheral side of the adjacent modular component, the modular component chamber cross-sectional area being 6% to 25% of the underdrain chamber cross-sectional area.

In various embodiments, a depth dimension of the first peripheral side is greater than a depth dimension of the second peripheral side.

In various embodiments, the first peripheral side comprises a foot for securing the intermediate modular component to the substrate.

In various embodiments, the intermediate modular component further comprises a seal positioned between the first mating portion and the second mating portion of the adjacent modular component.

In various embodiments, the set of one or more remote orifices comprises a remote end orifice disposed at an end of the metering pipe most remote from the modular component chamber.

Various embodiments of a modular underdrain system comprising a plurality of modular components are disclosed. Each of the plurality of modular components may comprise a depth dimension, a width dimension, and a length dimension. The plurality of modular components may comprise at least one intermediate modular component. The intermediate modular component may comprise a first peripheral side and a second peripheral side with the first peripheral side being opposite the second peripheral side along the width dimension. The first peripheral side may comprise a first mating portion, and the second peripheral side may comprise a second mating portion with the second mating portion being sized and shaped to engage with a first mating portion of an adjacent modular component. The first peripheral side may comprise at least one transfer orifice.

The intermediate modular component may comprise a modular component chamber bounded by an underdrain floor side and an internal side with the underdrain floor side being offset from at least a portion of the internal side along the depth dimension. The underdrain floor side may comprise a plurality of slots, and the internal side may comprise a metering pipe opening.

The intermediate modular component may also comprise a metering pipe sized to be positioned within the metering pipe opening. The metering pipe opening may comprise a distributor head for positioning within the modular component chamber and an outside portion for positioning outside of the modular component chamber. The outside portion of the metering pipe may comprise a set of one or more proximate orifices and a set of one or more remote orifices with the set of one or more proximate orifices being disposed closer to the modular component chamber along the depth dimension than the set of one or more remote orifices.

In various embodiments, the second mating portion comprises a tang, and the first mating portion of the adjacent modular component comprises an engaging slot.

In a number of embodiments, the at least one transfer orifice comprises a first transfer orifice and a second transfer orifice, the first transfer orifice and the second transfer orifice being offset along the depth dimension.

In various embodiments, the modular component chamber comprises a first subchamber separated by a baffle from a second subchamber, the baffle limiting fluid flow between the first subchamber and the second subchamber.

In a number of embodiments, when the modular underdrain system is in an installed state, the modular component chamber has a modular component chamber cross-sectional area bounded by the internal side and the underdrain floor side, and the intermediate modular component has an underdrain chamber cross-sectional area bounded by the internal side, the first peripheral side, a substrate to which the first peripheral side is attached, the second peripheral side, and a first peripheral side of the adjacent modular component, the modular component chamber cross-sectional area being 6% to 25% of the underdrain chamber cross-sectional area.

Various embodiments of a modular underdrain system comprising at least a first and a second intermediate modular component are disclosed. Each of the first and the second intermediate modular components each may comprise a depth dimension, a width dimension, and a length dimension. Each of the first and second intermediate modular components may comprise a first peripheral side and a second peripheral side with the first peripheral side being opposite the second peripheral side along the width dimension. The first peripheral side may comprise a first mating portion and the second peripheral side comprising a second mating portion with the second mating portion being sized and shaped to engage with a first mating portion of an adjacent modular component. The first peripheral side comprising at least one transfer orifice.

Each of the first and second intermediate modular component may comprise a modular component chamber bounded by an underdrain floor side and an internal side with the underdrain floor side being offset from at least a portion of the internal side along the depth dimension. The underdrain floor side may comprise a plurality of slots, and the internal side may comprise a metering pipe opening.

Each of the first and second intermediate modular components may also comprise a metering pipe sized to be positioned within a metering pipe opening. The metering pipe may comprise a distributor head for positioning within the modular component chamber and an outside portion for positioning outside of the modular component chamber. The outside portion of the metering pipe may comprise a set of one or more proximate orifices and a set of one or more remote orifices with the set of one or more proximate orifices being disposed closer to the modular component chamber along the depth dimension than the set of one or more remote orifices.

In various embodiments, when the first mating portion of the first intermediate modular component is engaged with the second mating portion of the second intermediate modular component a combination of the underdrain floor side of the first intermediate modular component and the underdrain floor side of the second intermediate modular component define a substantially flat surface.

The modular drain system may further comprise a hold down member positioned on or adjacent to the substantially flat surface.

The modular underdrain system may further comprise a terminating modular underdrain component devoid of transfer orifices for engaging with the second intermediate modular component. The modular underdrain system may further comprise a starter strip for engaging with a third intermediate modular component.

BRIEF DESCRIPTION OF THE DRAWINGS

Various embodiments of the invention will become apparent from the following description and appended claims, taken in conjunction with the accompanying drawings. Understanding that these drawings depict only examples of the invention thereof and are, therefore, not to be considered limiting of the invention's scope, particular embodiments will be described with additional specificity and detail through use of the accompanying drawings in which:

FIG. 4A is a top perspective view of a segment of an intermediate modular component shown in FIGS. 1-3;

FIG. 4B is a bottom perspective view of the segment (i.e., a portion) of the intermediate modular component depicted in FIG. 4A;

FIG. 4C is a front elevational view of the segment of the intermediate modular component shown in FIG. 4A;

FIG. 4D is a rear elevational view of the segment of the intermediate modular component shown in FIG. 4A;

FIG. 4E is a side elevational view of the segment of the intermediate modular component shown in FIG. 4A;

FIG. 6A is an elevational, cross-sectional view of the segment of the intermediate modular component taken across the line 6A-6A in FIG. 4C;

FIG. 6B is an elevational, cross-sectional view of the segment of the intermediate modular component taken across the line 6B-6B in FIG. 4C;

FIG. 10A is a top perspective view of a segment of one embodiment of a starter strip for use in connection with a modular underdrain system;

FIG. 10B is a side view of the segment of the starter strip shown in FIG. 10A;

FIG. 10C is a front view of the segment of the starter strip shown in FIG. 10A;

FIG. 13A is a top perspective view of one embodiment of a hold down member for use in a modular underdrain system;

FIG. 13B is an elevational side view of the hold down member shown in FIG. 13A;

Figure 1:
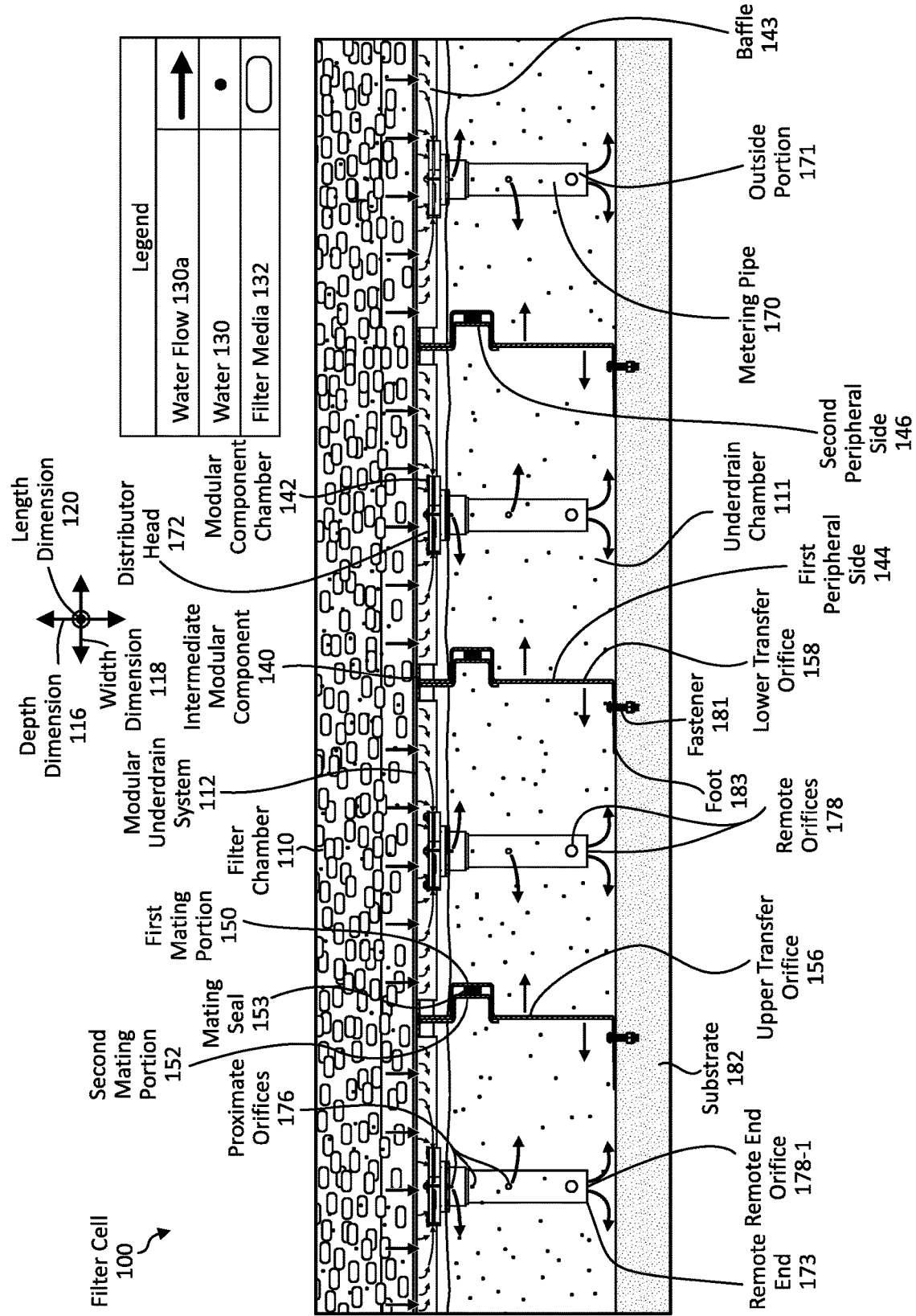
FIG. 1 is a cross-sectional view of one embodiment of a portion of a filter cell, including a modular underdrain system, in a filtering state.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the present disclosure are described below. It should be apparent that the teachings herein may be embodied in a wide variety of forms and that any specific structure, function, or both disclosed herein is merely representative. Based on the teachings herein, one skilled in the art should appreciate that an aspect disclosed herein may be implemented independently of any other aspects and that two or more of these aspects may be combined in various ways, even if that combination is not specifically illustrated in the figures. For example, an apparatus may be implemented, or a method may be practiced, using any number of the aspects set forth herein whether disclosed in connection with a method or an apparatus. Further, the disclosed apparatuses and methods may be practiced using structures or functionality known to one of skill in the art at the time this application was filed, although not specifically disclosed within the application.

By way of introduction, the following brief definitions are provided for various terms used in this application. Additional definitions will be provided in the context of the discussion of the figures herein. As used herein, "exemplary" can indicate an example, an implementation, and/or an aspect, and should not be construed as limiting or as indicating a preference or a preferred implementation. Further, it is to be appreciated that certain ordinal terms (e.g., "first" or "second") can be provided for identification and ease of reference and may not necessarily imply physical characteristics or ordering. Therefore, as used herein, an ordinal term (e.g., "first," "second," "third") used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") can indicate "one or more" rather than "one." As used herein, a structure or operation that "comprises" or "includes" an element can include one or more other elements not explicitly recited. Thus, the terms "including," "comprising," "having," and variations thereof signify "including but not limited to" unless expressly specified otherwise. Further, an operation performed "based on" a condition or event can also be performed based on one or more other conditions or events not explicitly recited. As used in this application, the terms "an embodiment," "one embodiment," "another embodiment," or analogous language do not refer to a single variation of the disclosed subject matter; instead, this language refers to variations of the disclosed subject matter that can be applied and used with a number of different implementations of the disclosed subject matter. An enumerated listing of items does not imply that any or all of the items are mutually exclusive and/or mutually inclusive, unless expressly specified otherwise.

In the figures in the specification for this application, a reference numeral without a suffix (e.g., the suffix may comprise a lowercase letter or a hyphen followed by a number) may refer to one or more of a particular item, which may include a group of items. A reference numeral with a suffix comprising a hyphen followed by a number (e.g., 110-1, 110-2, 110-3, etc.) refers to a specific one of a group of items. In this case, the reference numeral without the suffix refers to all of the items in the group; when reference is made to a specific one of the items, a suffix comprising a hyphen followed by a number will be utilized. When multiple items in a group are present in a single figure, not all such items may be labeled with a reference numeral to avoid the undue proliferation of reference numerals on the figure. In addition, it should be noted that the general reference number (i.e., the reference number without a suffix) may be used in the figure and in the specification to refer to the items in the group or a reference numeral with the suffix may be used to refer to a specific item in the group. A reference numeral with a suffix comprising a lowercase letter (e.g., 100a, 100b, 100c, etc.) references an item that is a variation of the item bearing the reference numeral without the suffix (i.e., similar but not identical to the item bearing the reference numeral without the suffix). A suffix comprising a hyphen and a number and a suffix may be utilized together with the same reference numeral, when a specific instance of a variation is referenced.

For this application, the phrases "secured to," "connected to," "coupled to," and "in communication with" refer to any form of interaction between two or more entities, including mechanical, electrical, magnetic, electromagnetic, and thermal interaction and may also include integral formation. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanisms. The term "abut" refers to items that are in direct physical contact with each other, although the items may be attached, secured, fused, or welded together. The term "integrally formed" refers to a body that is manufactured integrally (i.e., as a single piece, without requiring the assembly of multiple pieces). Multiple parts may be integrally formed with each other if they are formed from a single workpiece. The term "offset" signifies that a center point of a first referenced object or feature and a center point of a second referenced object or feature are not aligned along one or more axes FIG. 1 is a cross-sectional view of one embodiment of a portion of a filter cell 100, including a modular underdrain system 112, in an installed state and also in filtering state. The filter cell 100 comprises a depth dimension 116, a length dimension 120, and a width dimension 118. It should be noted that the width dimension 118 of the filter cell 100 is not necessarily greater or smaller than the length dimension 120 of the filter cell 100.

The illustrated filter cell 100 comprises a filter chamber 110 and an underdrain chamber 111 separated by the modular underdrain system 112. A filtering water injection mechanism (illustrated subsequently) may be utilized to inject water 130 into the filter chamber 110 for filtration of the water 130 during a filtering state of the filter cell 100. Also, an air injection mechanism (illustrated subsequently) may be utilized to inject air into the underdrain chamber 111 during a cleaning state of the filter cell 100, which will be discussed in connection with FIG. 2. Also, a cleaning water injection mechanism (illustrated subsequently) may be utilized to inject water into the underdrain chamber 111 during a cleaning state of the filter cell 100, which cleaning state will be discussed in connection with FIG. 2.

Referring still to FIG. 1, filter media 132 may be disposed within the filter chamber 110. Particulate matter in the water 130 is captured by the filter media 132 during the filtering state, as water 130 flows in the manner indicated by the water flow arrows 130a. In an alternative embodiment, other types of fluids, besides water 130, may be filtered utilizing the filter cell 100.

A plurality of intermediate modular components 140 of the modular underdrain system 112 are illustrated in FIG. 1. Each intermediate modular component 140 may comprise a modular component chamber 142, a first peripheral side 144 and a second peripheral side 146. One or more upper transfer orifices 156 and one or more lower transfer orifices 158 may be disposed in the first peripheral side 144 to enable fluid to flow through the transfer orifices 156, 158. The transfer orifices 156, 158 enable the transfer of water 130 or another fluid, such as air, between the intermediate modular components 140 along the width dimension 118.

Each first peripheral side 144 may comprise a first mating portion 150, and each second peripheral side 146 may comprise a second mating portion 152. The first mating portion 150 is shaped and sized to engage with a second mating portion 152 of an adjacent intermediate modular component 140. The second mating portion 152 is shaped and sized to engage with a first mating portion 150 of an adjacent intermediate modular component 140. A mating seal 153 may be positioned between the first mating portion 150 and the second mating portion 152 to form a media-tight seal under normal operating conditions of the filter cell 100. The mating seal 153 may comprise, for example, a gasket, a sealant, caulking, or grout. As illustrated in FIG. 1, the first mating portion 150 may comprise a recess shaped to receive a protruding portion of the second mating portion 152. Of course, in alternative embodiments, the first mating portion 150 may comprise a protrusion, and the second mating portion 152 may comprise a recess. In yet other alternative embodiments, each of the first and second mating portions 150, 152 may comprise, for example, a plurality of mating protrusions and recesses.

Normal operating conditions in the filter cell 100 range from −8 feet of water to +25 feet of water (−3.5 pounds per square inch (PSI) to 11 PSI). In various embodiments, vacuum pressure may be applied to the underdrain chamber 111 to induce water flow through the filter cell 100. In alternative embodiments, no vacuum pressure is utilized, and water 130 may flow through the filter cell 100 solely based on the force of gravity or a pump. In various embodiments, one or more of vacuum pressure, a pump, and gravity may be utilized for directing water 130 through the filter cell 100.

As used herein, the term "media-tight" with reference to a seal or a fit refers to a seal or a fit that is sufficiently tight to prevent the passage of filter media 132 through the seal or fit in normal operating conditions. Individual portions of Filter media 132 have a smallest dimension of 0.008 inches or greater.

Each first peripheral side 144 may comprise a foot 183. A fastener 181 may be utilized to secure the foot 183 to a substrate 182.

Each intermediate modular component 140 may comprise one or more metering pipes 170. Each metering pipe 170 may comprise a distributor head 172 disposed within the modular component chamber 142. The portion of each metering pipe 170 outside of the modular component chamber 142 may be referred to as the outside portion 171, and may comprise one or more proximate orifices 176 and one or more remote orifices 178. The one or more proximate orifices 176 are closer to the modular component chamber 142 than the remote end 173 of the metering pipe 170, while the remote orifices 178 may be closer to the remote end 173 of the metering pipe 170. A remote end orifice 178-1 at the remote end 173 comprises one of the one or more remote orifices 178 and may be disposed at the remote end 173 of the metering pipe 170.

It should also be noted that one or more baffles 143 may be positioned within each modular component chamber 142. The baffles 143 limit the flow of fluid (e.g., air 128 and water 130) between subchambers, separated by the baffles 143, within the modular component chamber 142. The baffles 143 aid in even distribution of the water 130 through the metering pipes 170 in a case where there are multiple metering pipes 170 in a single modular component chamber 142, as will be illustrated subsequently.

In a filtering state of the filter cell 100, injected water 130, as indicated by the water flow arrows 130a, flows through the filter chamber 110 (with particulate matter being captured by the filter media 132), passes into the modular component chamber 142 through slots (discussed subsequently), passes from the modular component chamber 142 into the distributor head 172 and through the metering pipe 170, and exits from the metering pipe 170 via one or more of the proximate and remote orifices 176, 178. Thus, the apertures in the distributor head 172, the proximate and remote orifices 176, 178, and the slots serve as a restriction to limit water flow through the filter cell 100. Accordingly, the number and size of the orifices 176, 178, apertures in the distributor head 172, and the slots may be used to regulate water flow through the filter cell 100 to, for example, regulate the time in which the water 130 is disposed within the filter chamber 110.

Figure 2:
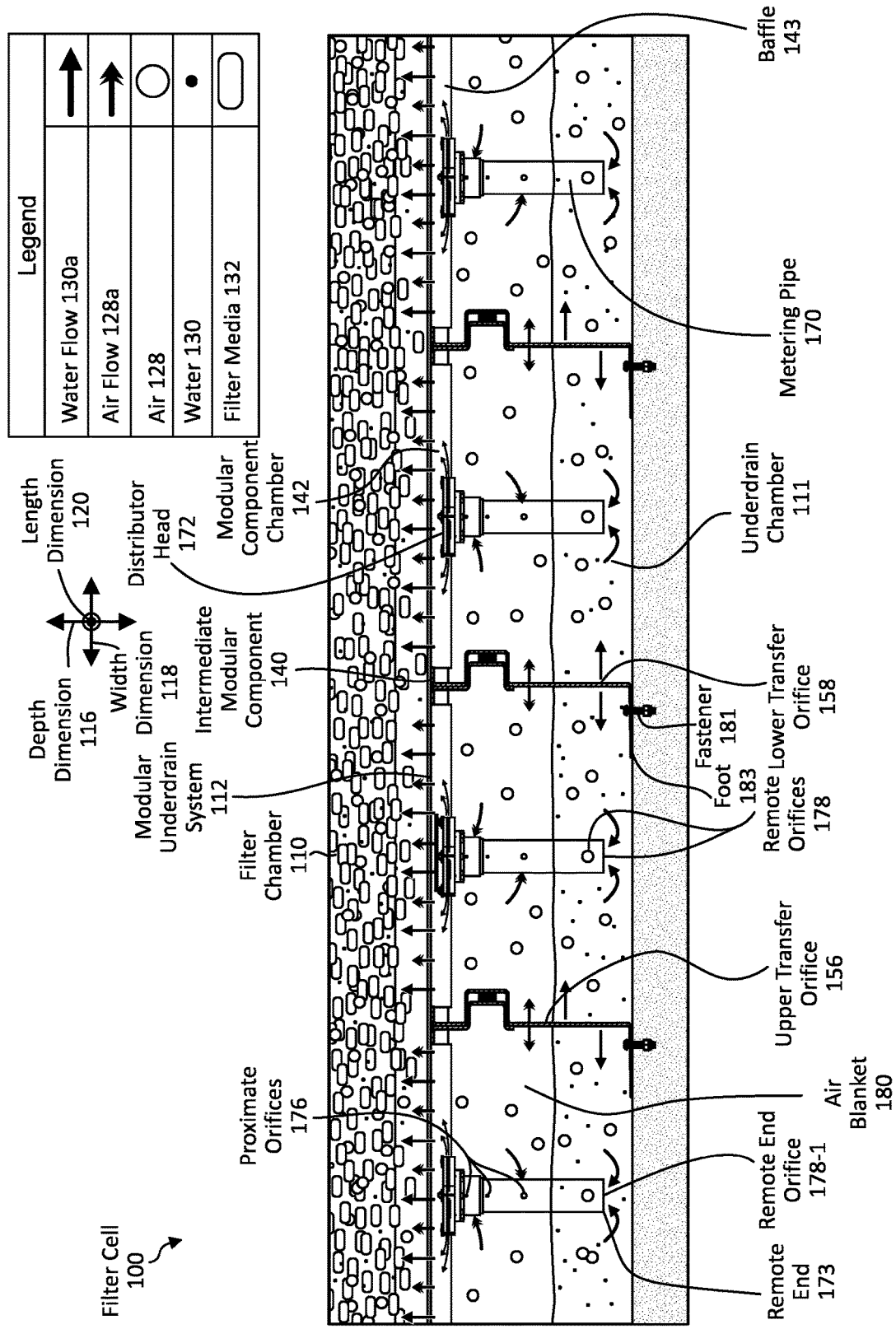
FIG. 2 is a cross-sectional view of the portion of the filter cell of FIG. 1 shown in a media cleaning state.

FIG. 2 is a cross-sectional view of the portion of the filter cell 100 of FIG. 1 shown in an installed state and also in a media cleaning state. As indicated previously, the filter cell 100 comprises a depth dimension 116, a width dimension 118, and a length dimension 120.

Periodically, it may be necessary to clean the filter media 132 as particulate matter accumulates on the filter media 132. Thus, an air injection mechanism, illustrated subsequently, may be utilized to inject air 128 into the underdrain chamber 111. A cleaning water injection mechanism, illustrated subsequently, may be utilized to inject water 130 into the underdrain chamber 111 during the cleaning state. Air 128 and water 130 may flow through one or more of the proximate and remote orifices 176, 178 (including the remote end orifice 178-1 at the remote end 173) of the metering pipes 170. The mixture of air 128 and water 130 may then proceed generally along a depth dimension 116 through the metering pipes 170 and exit the distributor heads 172 into the modular component chamber 142. Thereafter, the air 128 and water 130 may flow through slots (which will be illustrated subsequently) in the modular component chamber 142 and enter into the filter chamber 110. The air 128 and water 130 striking the filter media 132 may serve to dislodge captured particulate matter. This flow pattern is illustrated with the airflow and water flow arrows 128a, 130a shown in FIG. 2.

Restricted flow caused by the size and positioning of the proximate and remote orifices 176, 178, the openings in the distributor head 172, and the slots in the modular component chamber 142 limit the flow of air 128 into the filter chamber 110, thus resulting in an air blanket 180 disposed adjacent to the modular component chamber 142. A mixture of air 128 and water 130 may occur, for example, below the air blanket 180, within the filter chamber 110, within the metering pipes 170, and within the modular component chamber 142. It should also be noted that the upper transfer orifices 156 facilitate the movement of air 128 between the intermediate modular components 140, as illustrated in FIG. 2. Furthermore, the lower transfer orifices 158 enable water 130 to flow between the intermediate modular components 140 during the cleaning state.

In the case where there are multiple metering pipes 170 disposed within a modular component chamber 142, baffles 143 within each modular component chamber 142 may be utilized to even the flow of air 128 through the slots into the filter chamber 110. Without the baffles 143, even distribution of the air 128 through the filter chamber 110 is difficult to achieve, for example, causing more air 128 to pass through one side of the modular underdrain system 112 such that only a portion of the filter media 132 may adequately be cleaned during the cleaning state.

Figure 3:
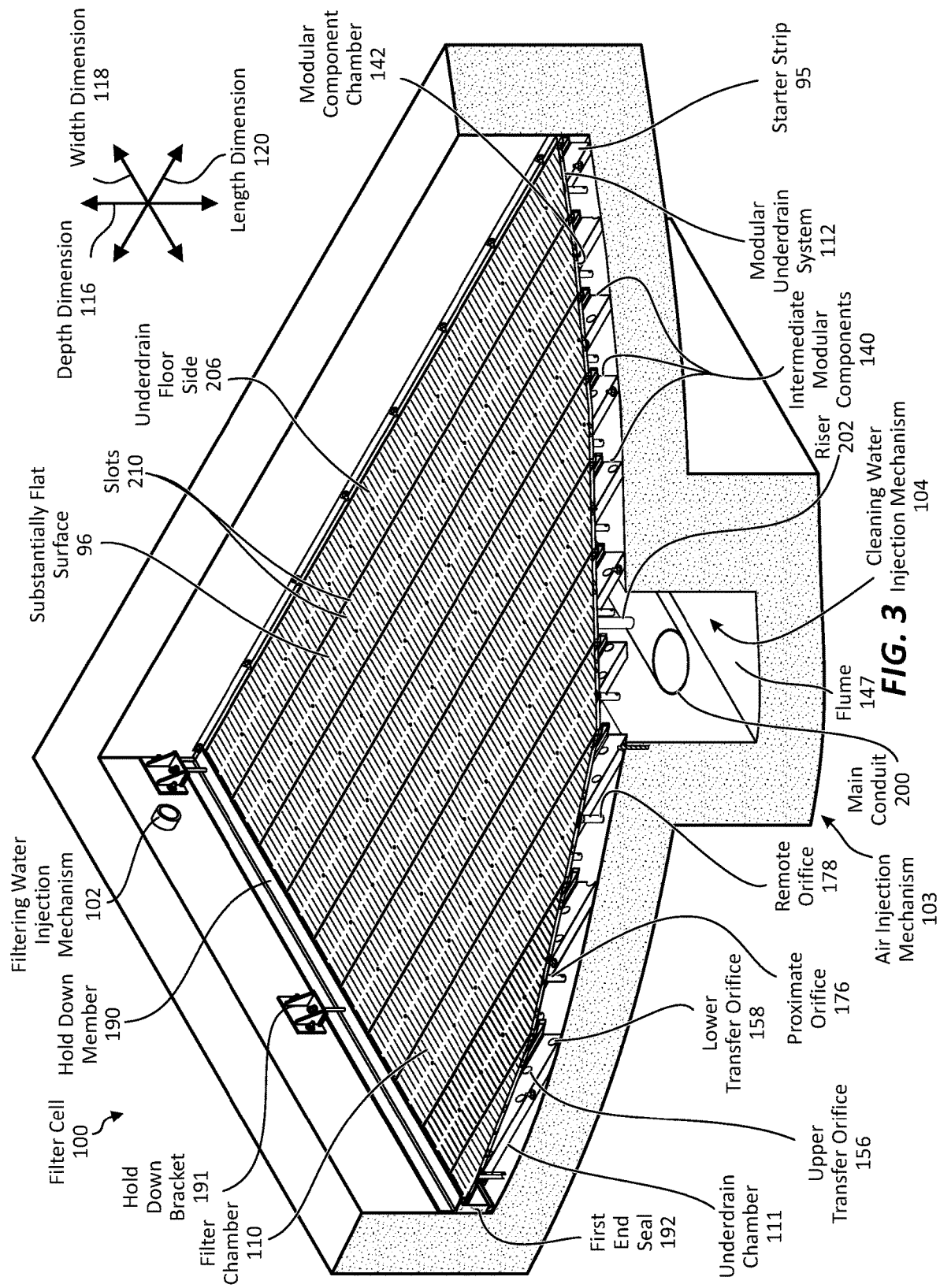
FIG. 3 is a cross-sectional view of a larger portion of the filter cell of FIG. 1 shown without filter media, water, or air disposed therein.
Figures 5A, 5B:
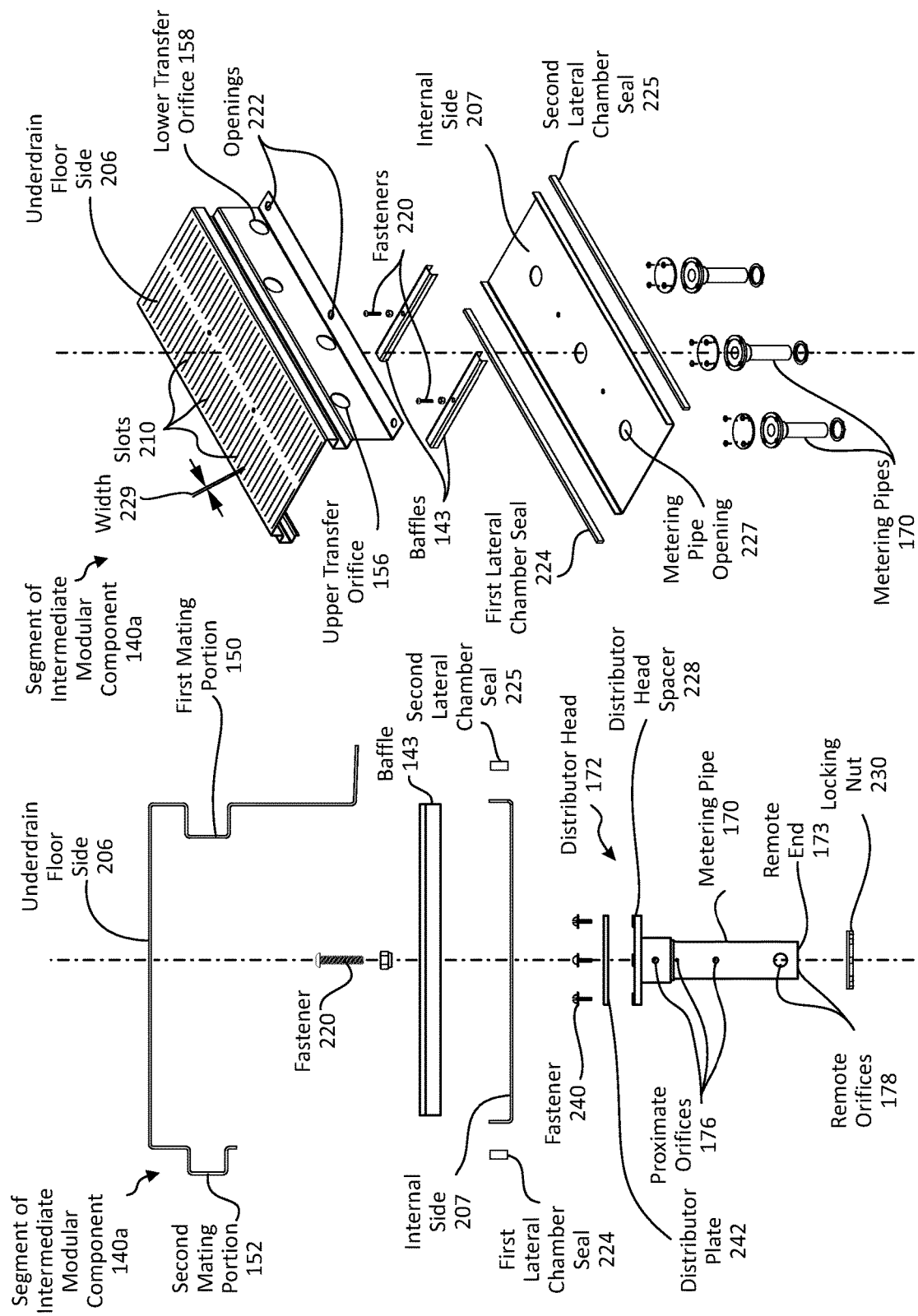
FIG. 5A is a front exploded view of the segment of the intermediate modular component shown in FIG. 4A.
FIG. 5B is a perspective exploded view of the segment of the intermediate modular component shown in FIG. 4A.

FIG. 3 is a cross-sectional view of a larger portion of the filter cell 100 of FIG. 1 shown without filter media 132, water 130, or air 128 disposed therein. The filter cell 100 and the modular underdrain system 112 in in FIG. 3 are shown in an installed state. As indicated in FIG. 3, the modular underdrain system 112 comprises a plurality of intermediate modular components 140 each extending along a length dimension 120 of the filter cell 100. As indicated previously, each intermediate modular component 140 may comprise, for example, one or more proximate and remote orifices 176, 178, and one or more upper and lower transfer orifices, 156, 158.

Each intermediate modular component 140 may also comprise an underdrain floor side 206, in which are disposed a series of slots 210. The slots 210 may be laser cut and must be sufficiently narrow such that the filter media 132 cannot pass through a slot 210. The slots 210 will be discussed in additional detail subsequently. In various alternative embodiments, each slot 210 may comprise a series of circular openings, or openings of other shapes, again being sufficiently narrow to preclude the passage of filter media 132 through the slot 210. The intermediate modular components 140 may be made, for example, of stainless steel.

The underdrain floor sides 206 of the intermediate modular components 140 define a substantially flat surface 96. In various embodiments, substantially flat signifies that there are no apertures or gaps greater than 2 inches across each of the width and length dimensions 118, 120, and no variation in the substantially flat surface greater than 2 inches along the depth dimension 116 of the filter cell 100.

A first end seal 192 may be held in place by a hold down member 190, which is secured by a plurality of hold down brackets 191. At the opposite end of the intermediate modular components 140, a second hold down bracket (not shown in FIG. 3) may comprise a part of the modular underdrain system 112. The first end seal 192 may form a media-tight seal adjacent to the hold down member 190. The first end seal 192 may comprise, for example, grout or a gasket. Also, one embodiment of a starter strip 95 may be positioned on one side of the modular underdrain system 112. The starter strip 95 will be explained in detail subsequently.

In addition, one embodiment of an air injection mechanism 103 is also illustrated. The air injection mechanism 103 comprises a main conduit 200 positioned within a flume 147 with risers 202 extending from the main conduit 200. As noted previously, the air injection mechanism 103 injects air 128 into the filter cell 100 during a cleaning state. More specifically, the air injection mechanism 103 injects air 128 into the underdrain chamber 111. It should be noted, once again, that the air injection mechanism 103 shown in FIG. 3 is only illustrative, and air injection mechanisms of many types may be utilized in connection with the filter cell 100.

One embodiment of a filtering water injection mechanism 102 for injecting water 130 to be filtered into the filter chamber 110 is also illustrated. The filtering water injection mechanism 102 may comprise a gravity and/or pump driven system for injecting water 130 into the filter chamber 110. In addition, a vacuum system (not shown) may be positioned within the underdrain chamber 111 (or elsewhere) for drawing water 130 through the filter cell 100 or toward the underdrain chamber 111. In an alternative embodiment, a filtering water injection mechanism may comprise one or more troughs (not shown) that may be filled by a set of one or more conduits, with the water spilling from the one or more troughs into the filter chamber 110.

Figure 11A:
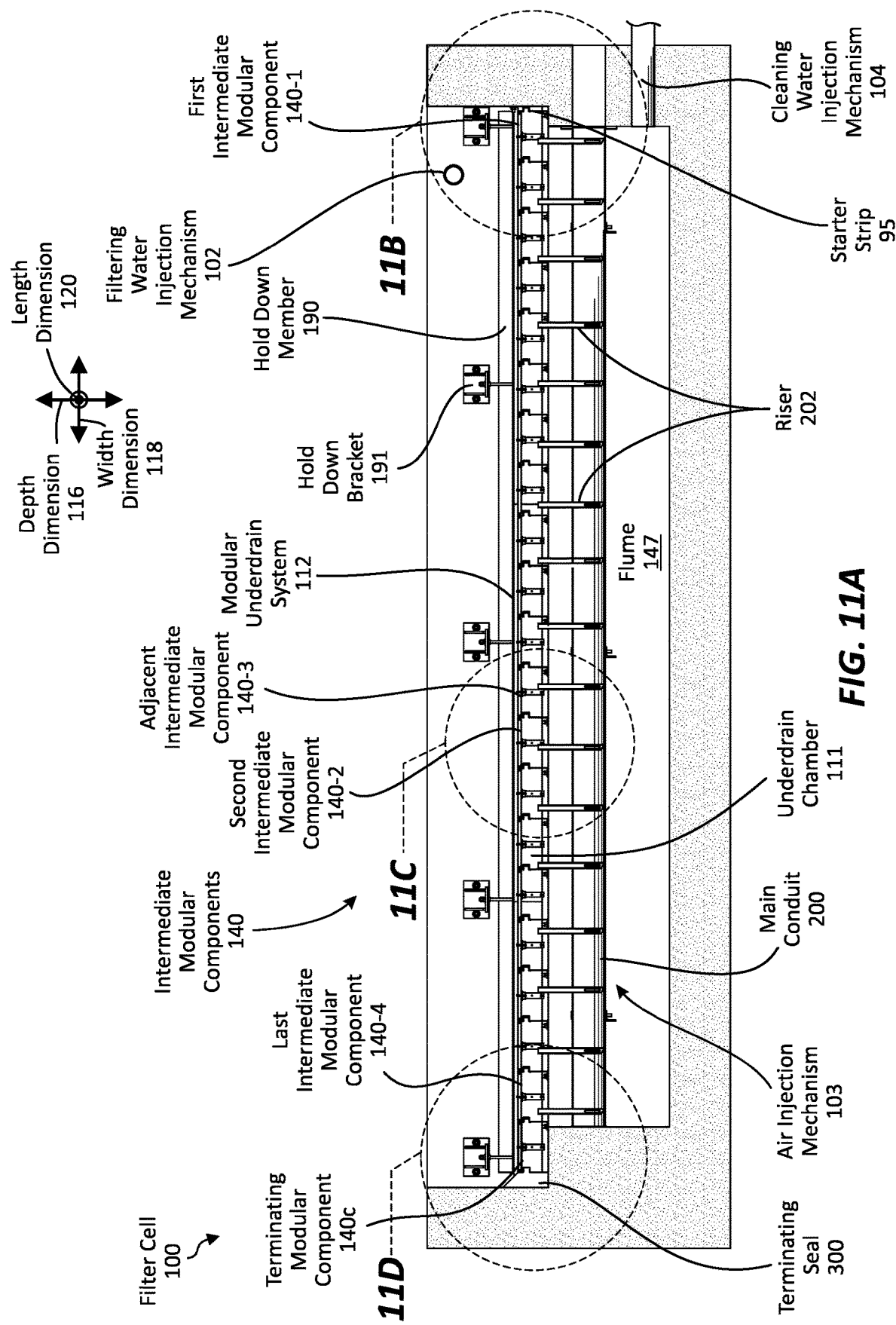
FIG. 11A is a side cross-sectional view of the filter cell shown in FIG. 3 taken across a width dimension of the filter cell.

In addition, the filter cell 100 may also comprise a cleaning water injection mechanism 104. The cleaning water injection mechanism 104 may comprise a gravity-driven and/or pump-driven mechanism for injecting water 128 into the underdrain chamber 111 in the cleaning state. In various embodiments, the cleaning water injection mechanism 104 delivers water into the flume 147. In the embodiment illustrated in FIG. 3, the cleaning water injection mechanism 104 is disposed within or adjacent to the flume 147. Because of the perspective of the view provided in FIG. 3, the cleaning water injection mechanism 104 is referenced but not visible in FIG. 3. One embodiment of the cleaning water injection mechanism 104 is, however, visible, for example, in FIG. 11A.

FIGS. 4A-4E, 5A-5B, 6A-6B, and 7 depict various views of a segment (i.e., portion) of an intermediate modular component 140a. The segment of the intermediate modular component 140a illustrated in FIGS. 4A-4E and 5A-5B comprises only a portion of the intermediate modular components 140 illustrated in FIGS. 1-3. The segment of the intermediate modular component 140a includes a depth dimension 116a, a width dimension 118a, and a length dimension 120a. The segment of the intermediate modular component 140a is included in these figures in order to more clearly illustrate the components of the intermediate modular components 140. In practice, an intermediate modular component 140 may be longer or shorter along the length dimension 120a than the intermediate modular components 140 or the segment of the intermediate modular components 140a illustrated in the figures. The illustrations provided serve only as examples and are not exhaustive of the proportions or dimensions of the intermediate modular components 140. While the segment of the intermediate modular component 140a is discussed in connection with these figures, the discussion applies equally to an intermediate modular component 140.

FIGS. 4A-4E and 5A-5B will be discussed concurrently. The segment of the intermediate modular component 140a comprises a first peripheral side 144, an underdrain floor side 206, a second peripheral side 146, an internal side 207, and one or more metering pipes 170. The underdrain floor side 206 and the internal side 207 define a modular component chamber 142. One or more baffles 143 may be positioned within the modular component chamber 142. The baffles 143 may define a series of subchambers, which will be discussed subsequently.

As indicated previously, the first peripheral side 144 may comprise one or more upper transfer orifices 156 and one or more lower transfer orifices 158. As indicated previously, the transfer orifices 156, 158 enable air 128 and water 130 to flow between segments of the intermediate modular components 140a. The upper transfer orifices 156 are disposed closer to the modular component chamber 142 along the depth dimension 116a than the lower transfer orifices 158. A relative position of the upper transfer orifices 156 and the lower transfer orifices 158 along the depth dimension 116a may be ascertained with reference to a center point of each transfer orifice 156, 158 (regardless of the size of each transfer orifice 156, 158) along the depth dimension 116a. During the cleaning state when an air blanket 180 is present, the lower transfer orifices 158 may enable water 130 to move between segments of intermediate modular components 140a, while the upper transfer orifices 156 enable air 128 to move between segments of intermediate modular components 140a. The first peripheral side 144 may further comprise a first mating portion 150 for engaging with a second mating portion 152 of a segment of an adjacent intermediate modular component 140a or a terminating modular component (which will be explained subsequently). The first peripheral side 144 may include a foot 183 comprising openings 222 in which fasteners may be positioned to secure the intermediate modular component 140 to a substrate 182.

The underdrain floor side 206 comprises a series of slots 210. As indicated previously, the slots 210 may be arranged in various configurations other than the configuration shown in the figures. For example, the slots 210 may be arranged diagonally with respect to a length dimension 120a or extend along a length dimension 120a of the segment of the intermediate modular component 140a. Also, each slot 210 may comprise a series of smaller openings, such as circular or square openings. As noted previously, the slots 210 must be sufficiently small to prevent passage of filter media 132 through the slots 210, but allow water 130 and air 128 to pass through the slots 210. In one embodiment the slots 210 have a width 229 of 0.007 inches plus or minus 0.001 inches. In applications in which either a gravel support bed or direct media is utilized within the filter chamber 110, the slots 210 could be up to 0.125 inches in width 229. Thus, the width 229 of the slots 210 may be affected by the type of filter media 132 employed within the filter cell 100.

The internal side 207 may comprise one or more metering pipe openings 227, in which a metering pipe 170 may be positioned. In one embodiment, the first peripheral side 144, the underdrain floor side 206, and the second peripheral side 146 may be integrally formed, while the internal side 207 may be separately formed. As illustrated, fasteners 220 may be used to secure the internal side 207 to the underdrain floor side 206. A first lateral chamber seal 224 and a second lateral chamber seal 225 may be utilized to create a media-tight seal for the modular component chamber 142 (i.e., between the internal side 207 and the first peripheral side 144 and the second peripheral side 146). The fasteners 220 may also be employed to secure baffles 143 within the modular component chamber 142.

The second peripheral side 146 comprises a second mating portion 152 for engaging with a first mating portion 150 of an adjacent segment of an intermediate modular component 140a or a starter strip 95. As noted above, both the first and second mating portions 150, 152 may be configured in various ways to form a media-tight fit when used in connection with a mating seal 153. It should be noted that the mating seal 153 may comprise a gasket, sealant, caulking, grout, or any other type of material capable of forming a media-tight seal.

As indicated previously, one or more metering pipes 170 may be positioned at least partially within the modular component chamber 142. In particular, a distributor head 172 of each metering pipe 170 may be positioned within the modular component chamber 142. The distributor head 172 may comprise, in various embodiments, a distributor head plate 242, a plurality of fasteners 240, and distributor head spacers 228, which will be explained in greater detail hereafter. A locking nut 230 may be used to secure the distributor head 172 within the modular component chamber 142. The metering pipe 170 may comprise a set of one or more proximate orifices 176 and a set of one or more remote orifices 178. A center point of each of the proximate orifices 176 (along the depth dimension 116a) are positioned closer to the distributor head 172 (or the modular component chamber 142) than a remote end 173 of the metering pipe 170. In contrast, a center point of each of the remote orifices 178 (again along the depth dimension 116a) is positioned closer to the remote end 173 of the metering pipe 170 than to the distributor head 172 (or the modular component chamber 142). As noted above, one of the remote orifices 178 comprises a remote end orifice 178-1 which is located at the remote end 173 of the metering pipe 170.

Figure 7:
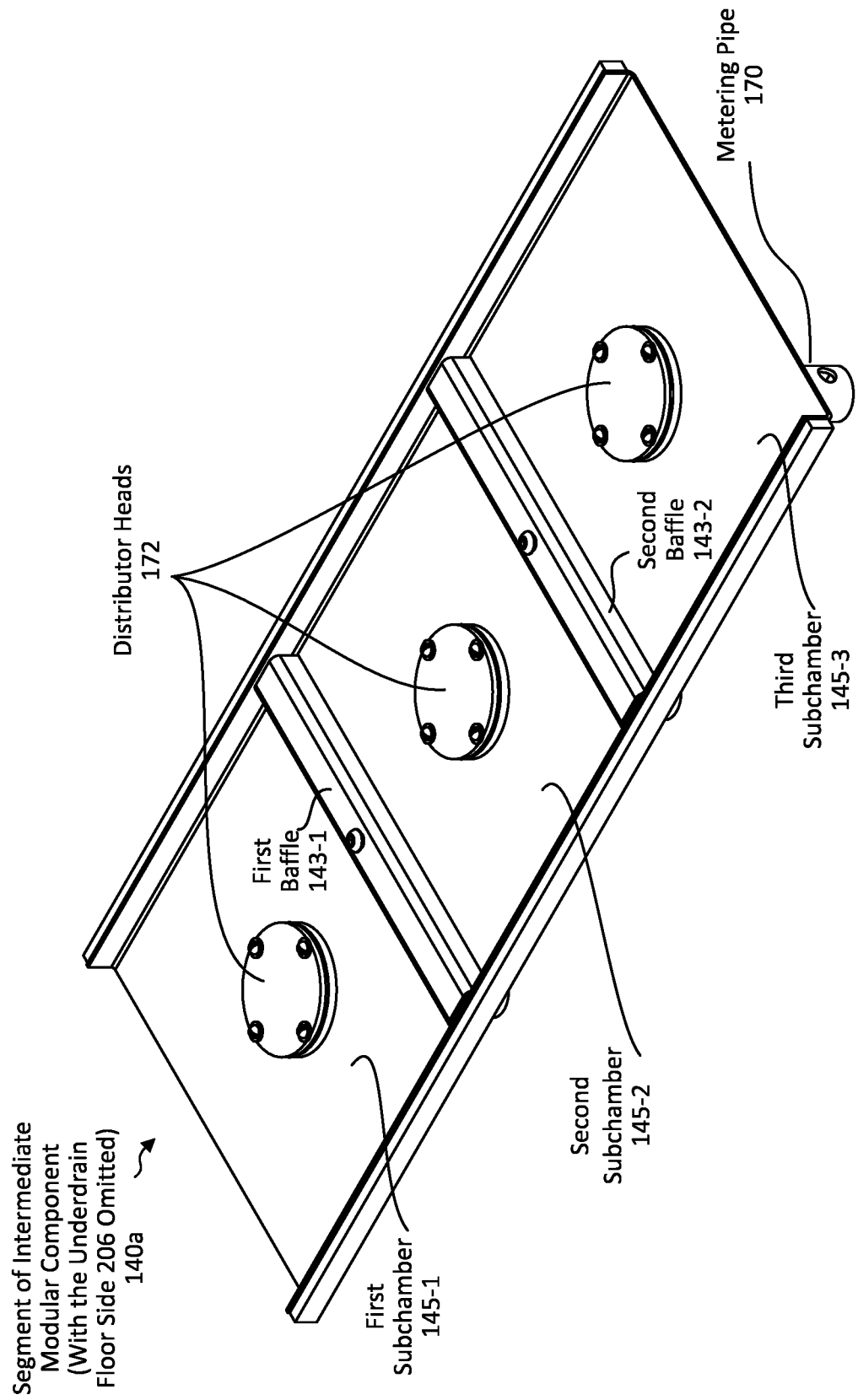
FIG. 7 is a top perspective view of the segment of the intermediate modular component shown in FIG. 4A with the underdrain floor side omitted.

FIGS. 6A, 6B, and 7 will be discussed concurrently. It should be noted that FIG. 6A is an elevational, cross-sectional view of the segment of the intermediate modular component 140a taken across the line 6A-6A in FIG. 4C; FIG. 6B is an elevational, cross-sectional view of the segment of the intermediate modular component 140a taken across the line 6B-6B in FIG. 4C; and FIG. 7 is a top perspective view of the segment of the intermediate modular component 140a shown in FIG. 4A with the underdrain floor side 206 omitted to better illustrate subchambers.

As illustrated in these figures, the segment of the intermediate modular component 140*a* may comprise a first baffle 143-1 and a second baffle 143-2, which divide the modular component chamber 142 into a first subchamber 145-1, a second subchamber 145-2, and a third subchamber 145-3. It should be noted that the number of baffles 143 and subchambers 145 may be varied within the scope of the disclosed subject matter.

The baffles 143 limit the flow of fluid (e.g., water 130 and air 128) between the subchambers 145. This limitation results in, for example, a more even distribution of air 128 during the cleaning state such that a large portion of the air proceeding up through an associated metering pipe 170 (through the distributor heads 172) will remain within the associated subchamber 145 and exit from the associated slots 210 within the subchamber 145. In the absence of the baffles 143, the air 128 may move to a side or portion of the filter cell 100, resulting in uneven distribution of the cleaning effect of the air 128.

Figure 8:
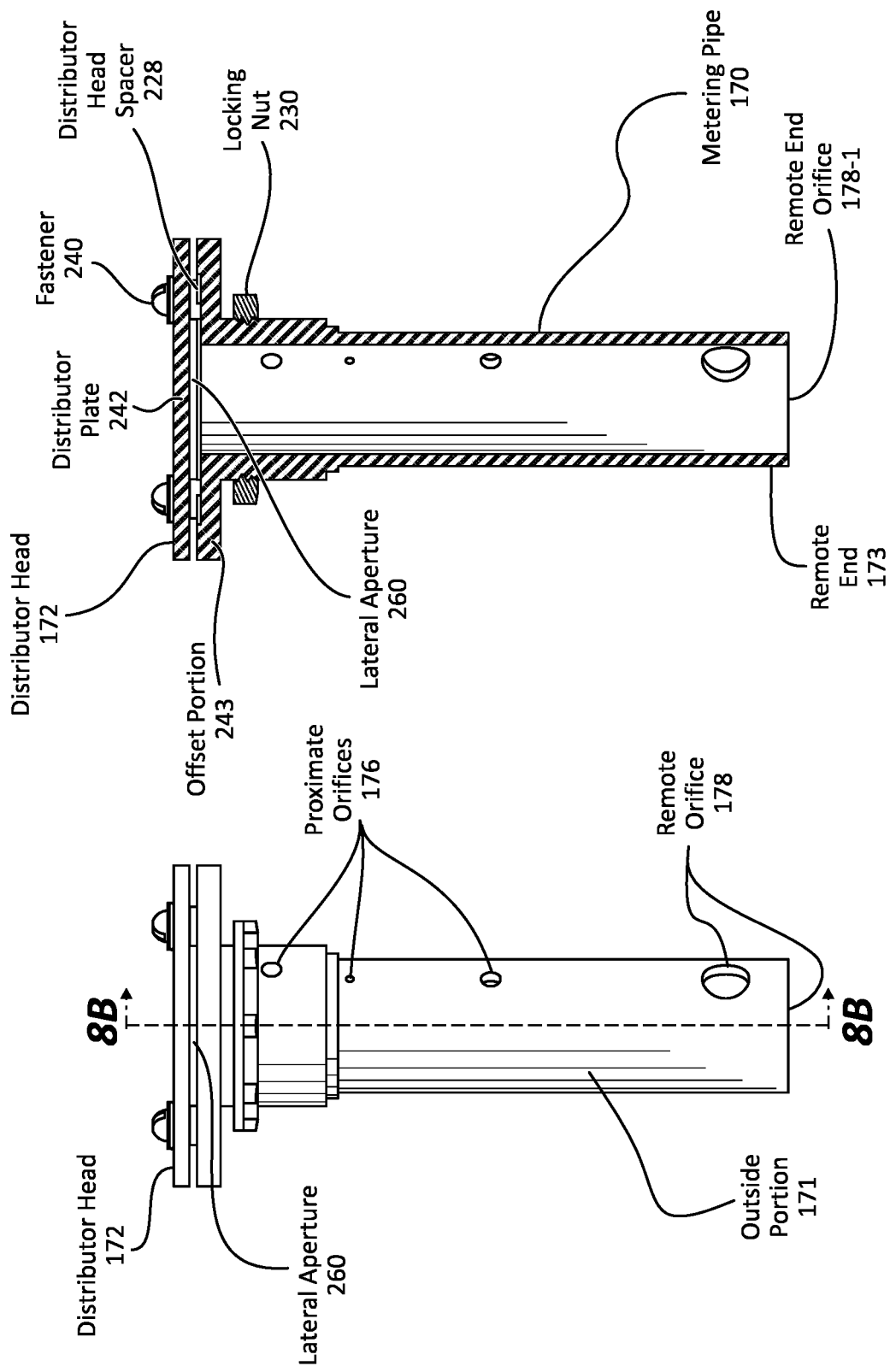
FIG. 8A is an elevational side view of a metering pipe of the intermediate modular component of FIG. 4A.
FIG. 8B is a cross-sectional side view of the metering pipe taken across the line 8B-8B shown in FIG. 8A.

Referring now to FIGS. 8A-8B, FIG. 8A is an elevational side view of a metering pipe of the intermediate modular component of FIG. 4A, and FIG. 8B is a cross-sectional side view of the metering pipe taken across the line 8B-8B shown in FIG. 8A. Each metering pipe 170 may comprise an outside portion 171 (the portion of the metering pipe 170 outside of the modular component chamber 142 when attached thereto) and a distributor head 172. The distributor head 172 comprises a distributor head plate 242, an offset portion 243, one or more fasteners 240 and one or more distributor head spacers 228. The one or more fasteners 240 are used to secure the distributor head 172 to the offset portion 243. One or more distributor head spacers 228 are positioned between the offset portion 243 and the distributor head plate 242 to define one or more lateral apertures 260 (between the distributor head spacers 228) through which air 128 and water 130 may pass into and out of the metering pipe 170. The outside portion 171 may comprise one or more proximate orifices 176 and one or more remote orifices 178. As noted, the remote end orifice 178-1 at the remote end 173 is one of the remote orifices 178. As indicated previously, a locking nut 230 may be used to secure the metering pipe 170 to the internal side 207 at least partially within the modular component chamber 142.

The metering pipe 170 may be embodied in various ways other than as shown in the figures. For example, the metering pipe 170 may be devoid of lateral apertures and may include one or more apertures on other positions on the metering pipe 170, such as on the top of the metering pipe 170 (i.e., an opening on the end of the metering pipe 170 opposite the remote end 173). Also, the positioning, number and size of the proximate and remote orifices 176, 178 may be varied within the scope of the disclosed subject matter.

Figure 9:
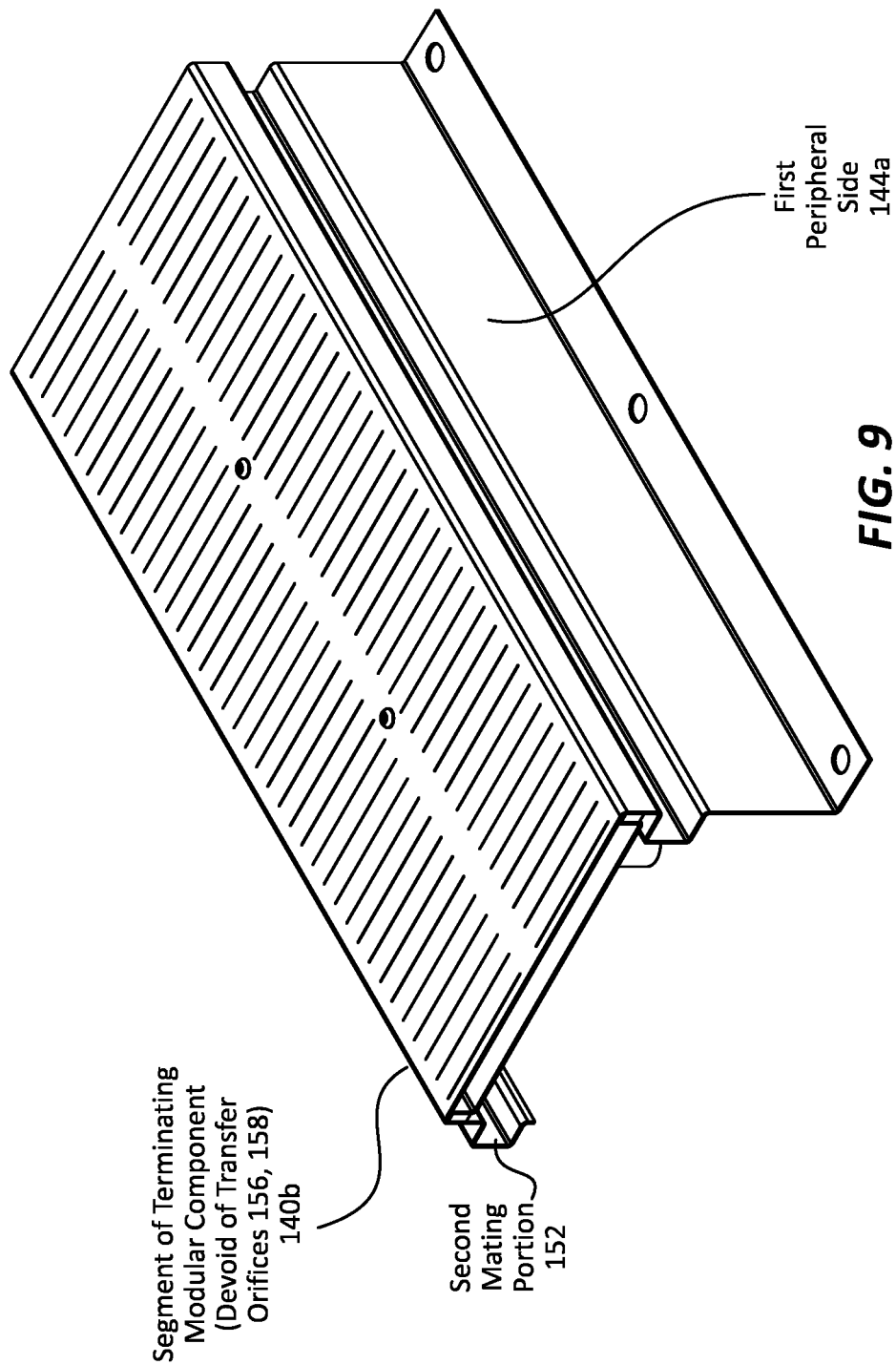
FIG. 9 is a top perspective view of one embodiment of a segment of a terminating modular component for use in a modular underdrain system.

FIG. 9 is a top perspective view of one embodiment of a segment of a terminating modular component 140*b* for use in a modular underdrain system 112. It should be noted that the term "segment" indicates that the segment of the terminating modular component 140*b* comprises only a portion of a terminating modular component. Thus, in practice, a terminating modular component may be longer or shorter than the illustrated segment of the terminating modular component 140*b*, and may include, for example, different numbers of subchambers 145 and/or metering pipes 170. Thus, while the segment of the terminating modular component 140*b*, is discussed in connection with FIG. 9, the discussion applies equally to a terminating modular component.

The segment of the terminating modular component 140*b* is similar to the segment of the intermediate modular component 140*a* with the exception that transfer orifices 156, 158 are omitted from the segment of the terminating modular component 140*b*. This is because the segment of the terminating modular component 140*b* is designed to be positioned at an outside edge of the modular underdrain system 112. The transfer orifices 156, 158 are designed to enable air 128 and water 130 to transfer between adjacent modular components. As a result, the transfer orifices 156, 158 are omitted from the first peripheral side 144*a* of the segment of the terminating modular component 140*b*. Beyond the absence of the transfer orifices 156, 158, the segment of the terminating modular component 140*b* and the segment of the intermediate modular component 140*a* may otherwise be identical or similar in various embodiments.

Figure 11B:
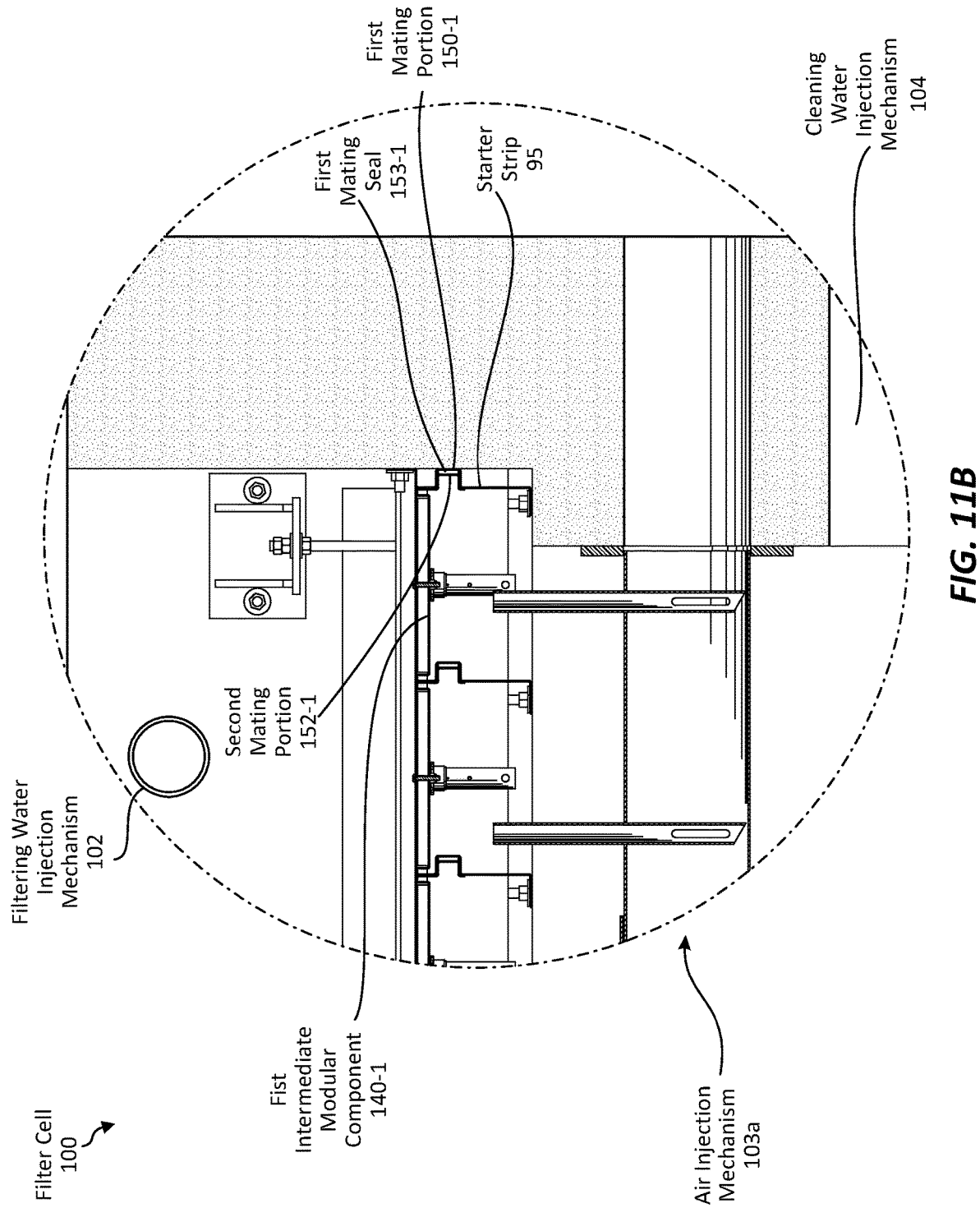
FIG. 11B is an enlarged view of the region 11B shown in FIG. 11A.

The second mating portion 152 of the segment of the terminating modular component 140*b* is shaped and sized to engage with a first mating portion 150 of an adjacent segment of an intermediate modular component 140*a*. The terminating modular component will be discussed further in connection with FIGS. 11A and 11B.

FIGS. 10A-10C comprise various views of a segment of one embodiment of a starter strip 95*a* for use in connection with a modular underdrain system 112 and will be discussed concurrently. It should be noted that the term "segment" indicates that the segment of the starter strip 95*a* comprises only a portion of a starter strip 95. Thus, in practice, a starter strip 95 may be longer or shorter than the illustrated segment of the starter strip 95*a*. Thus, while the segment of the starter strip 95*a* is discussed in connection with these figures, the discussion applies equally to a starter strip 95.

The illustrated segment of a starter strip 95*a* comprises a wall mounting plate 288 including one or more openings 289 for receiving fasteners to secure the segment of the starter strip 95*a* to a wall of a filter cell 100. The segment of the starter strip 95*a* may also comprise a first mating portion 150 for engaging with a second mating portion 152 of a segment of an adjacent intermediate modular component 140*a*. The segment of the starter strip 95*a* may also comprise a foot 284 having openings 286 for receiving fasteners for securing the segment of the starter strip 95*a* to a substrate 182 of a filter cell 100.

The segment of the starter strip 95*a* may be embodied in various ways other than as illustrated in the figures. For example, the first mating portion 150 of the segment of the starter strip 95*a* may comprise a protruding portion rather than a recessed portion.

FIGS. 11A-11D comprise various cross-sectional views of the filter cell 100 shown in FIG. 3 taken across a width dimension 118 of the filter cell 100 and will be discussed concurrently. As indicated previously, the filter cell 100 may comprise a depth dimension 116, a width dimension 118, and a length dimension 120. The filter cell 100 and the modular underdrain system 112 in FIGS. 11A-11D are shown in an installed state. The filter cell 100 in these figures is shown devoid of air 128, water 130, and filter media 132.

As illustrated, the filter cell 100 may comprise a modular underdrain system 112. The modular underdrain system 112 may comprise a filtering water injection mechanism 102 an air injection mechanism 103 and a cleaning water injection mechanism 104. The filtering water injection mechanism 102 may include a pump, a vacuum, and/or gravity driven mechanisms for injecting water 130 into the filter cell 100. The cleaning water injection mechanism 104 may comprise a pump or gravity driven mechanism for injecting water 128 into the underdrain chamber 111 in the clean date.

An embodiment of the air injection mechanism 103 comprising a main conduit 200 and a plurality of risers 202 disposed within a flume 147 is also illustrated. The risers 202 distribute air 128 throughout the modular underdrain system 112 when the filter cell 100 is in a cleaning state.

A hold down member 190 and one or more hold down brackets 191 are also illustrated. The hold down member 190 and one or more hold down brackets 191 limit movement of an underlying seal along a depth dimension 118, as will be illustrated and explained in connection with FIGS. 12A-12B. The illustrated hold down brackets 191 and hold down member 190 merely comprise illustrative embodiments of potential designs for these components. The hold down member 190 will be discussed subsequently in additional detail.

The modular underdrain system 112 may comprise a starter strip 95 and a plurality of modular components, such as a first intermediate modular component 140-1, an adjacent intermediate modular component 140-3, a second intermediate modular component 140-2, a last intermediate modular component 140-4, and a terminating modular component 140c. A first mating portion 150-1 of the starter strip 95 is shown in engagement with a second mating portion 152-1 of the first intermediate modular component 140-1 with an inter-positioned first mating seal 153-1. A first mating portion 150-2 of the adjacent intermediate modular component 140-3 is engaged with a second mating portion 152-2 of the second intermediate modular component 140-2 with an inter-positioned second mating seal 153-2. A first mating portion 150-3 of the last intermediate modular component 140-4 is engaged with a second mating portion 152-3 of the terminating modular component 140b with an inter-positioned third mating seal 153-3.

A peripheral side 144-3 of the terminating modular component 140b is in a media-tight engagement with a terminating seal 300. The terminating seal 300 may comprise, for example, grout or another mechanism for creating a media-tight seal with the peripheral side 144-3 of the terminating modular component 140b. The terminating seal 300 may also provide support to the peripheral side 144-3 of the terminating modular component 140b to counterbalance fluid pressure applied to the peripheral side 144-3 of the terminating modular component 140b when in operation.

Figure 11C:
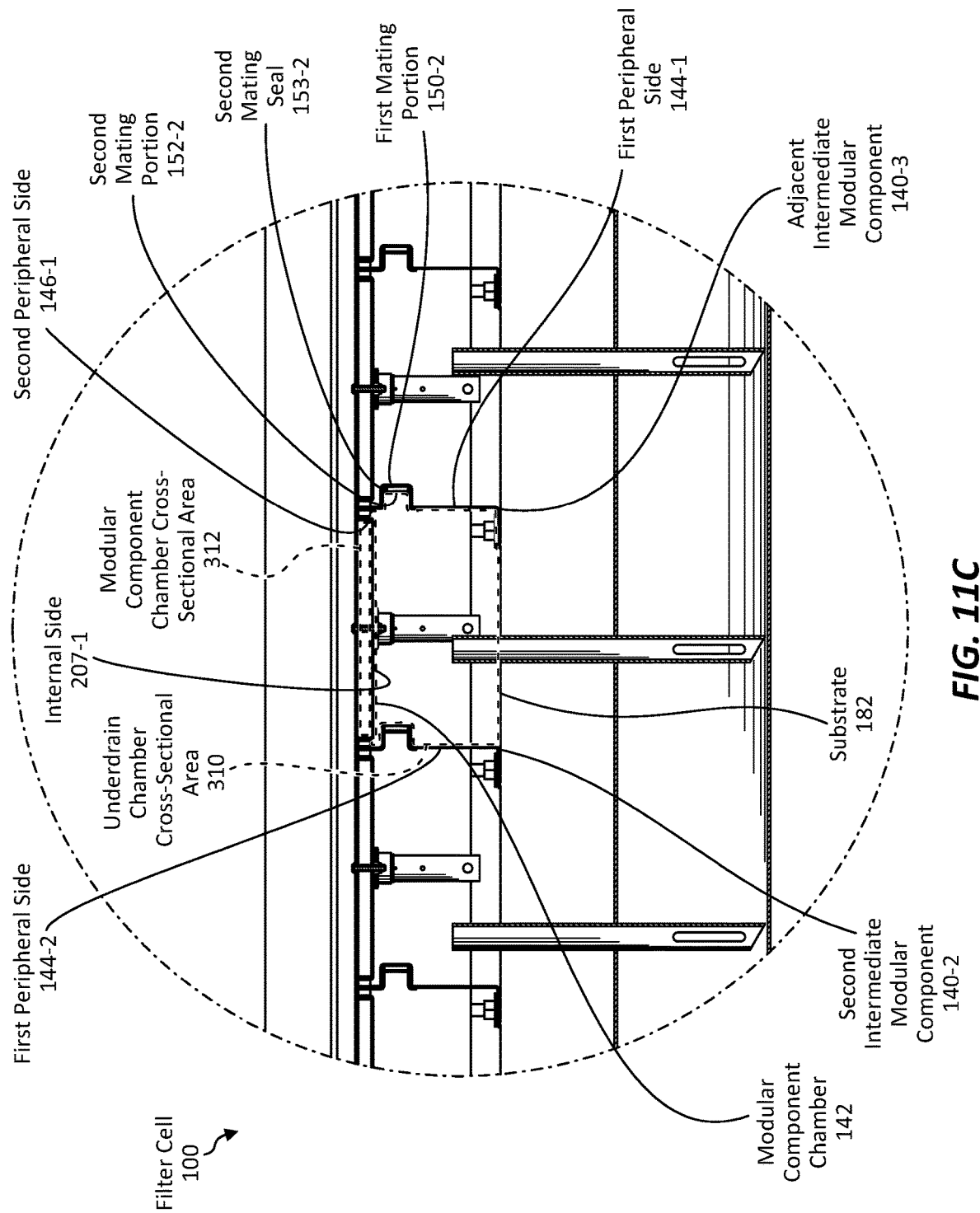
FIG. 11C is an enlarged view of the region 11C shown in FIG. 11A.
Figure 11D:
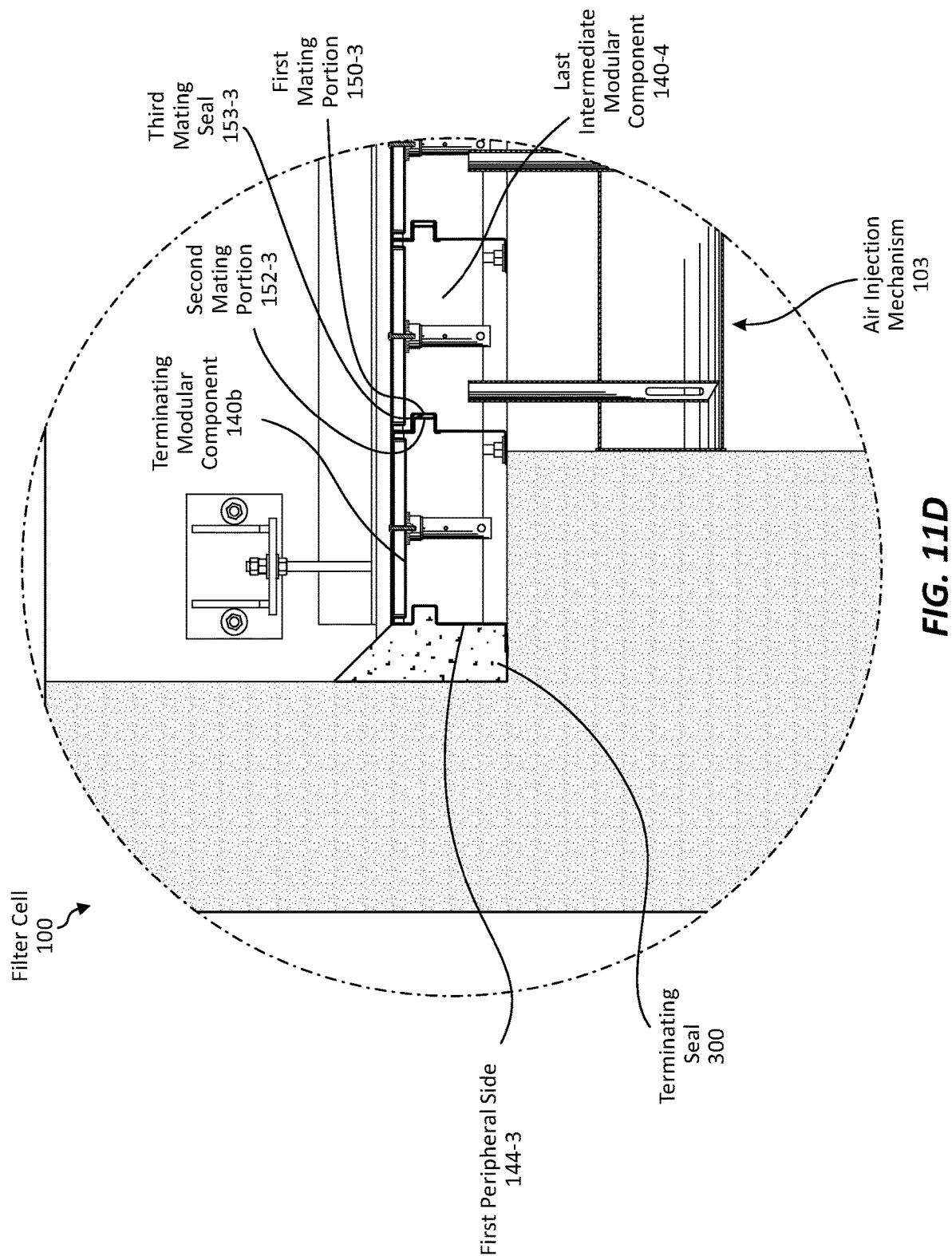
FIG. 11D is an enlarged view of the region 11D shown in FIG. 11A.

Referring now to the second intermediate modular component 140-2, which is illustrated specifically in FIG. 11C. In this figure, an underdrain chamber cross-sectional area 310 and a modular component chamber cross-sectional area 312 are illustrated. The underdrain chamber cross-sectional area 310 is bounded by the internal side 207-1, the first peripheral side 144-2 of the second intermediate modular component 140-2, the substrate 182 to which the first peripheral side 144-2 is attached, the second peripheral side 146-1 of the second intermediate modular component 140-2, and a first peripheral side 144-1 of the adjacent intermediate modular component 140-3. The modular component chamber cross-sectional area 312 is the cross-sectional area of the modular component chamber 142 of the second intermediate modular component 140-2. In various embodiments, the modular component chamber cross-sectional area 312 is 6% to 25% of the underdrain chamber cross-sectional area 310. When the intermediate modular component 140 is configured in this manner, improved air and water flow patterns are achieved during both the filtering state and the cleaning state.

Figure 12A:
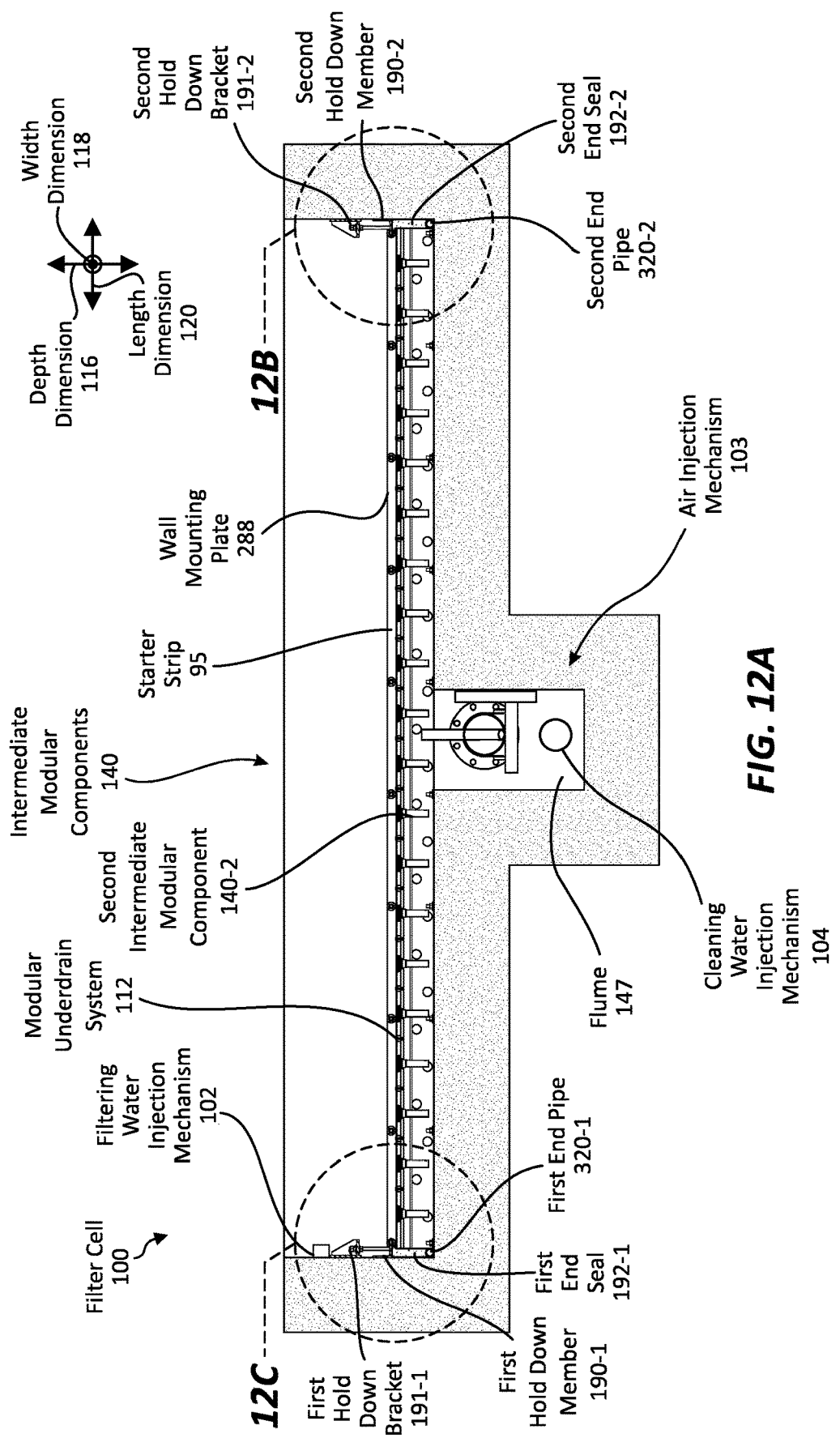
FIG. 12A is a side cross-sectional view of the filter cell shown in FIG. 3 taken across a length dimension of the filter cell.
Figure 12B:
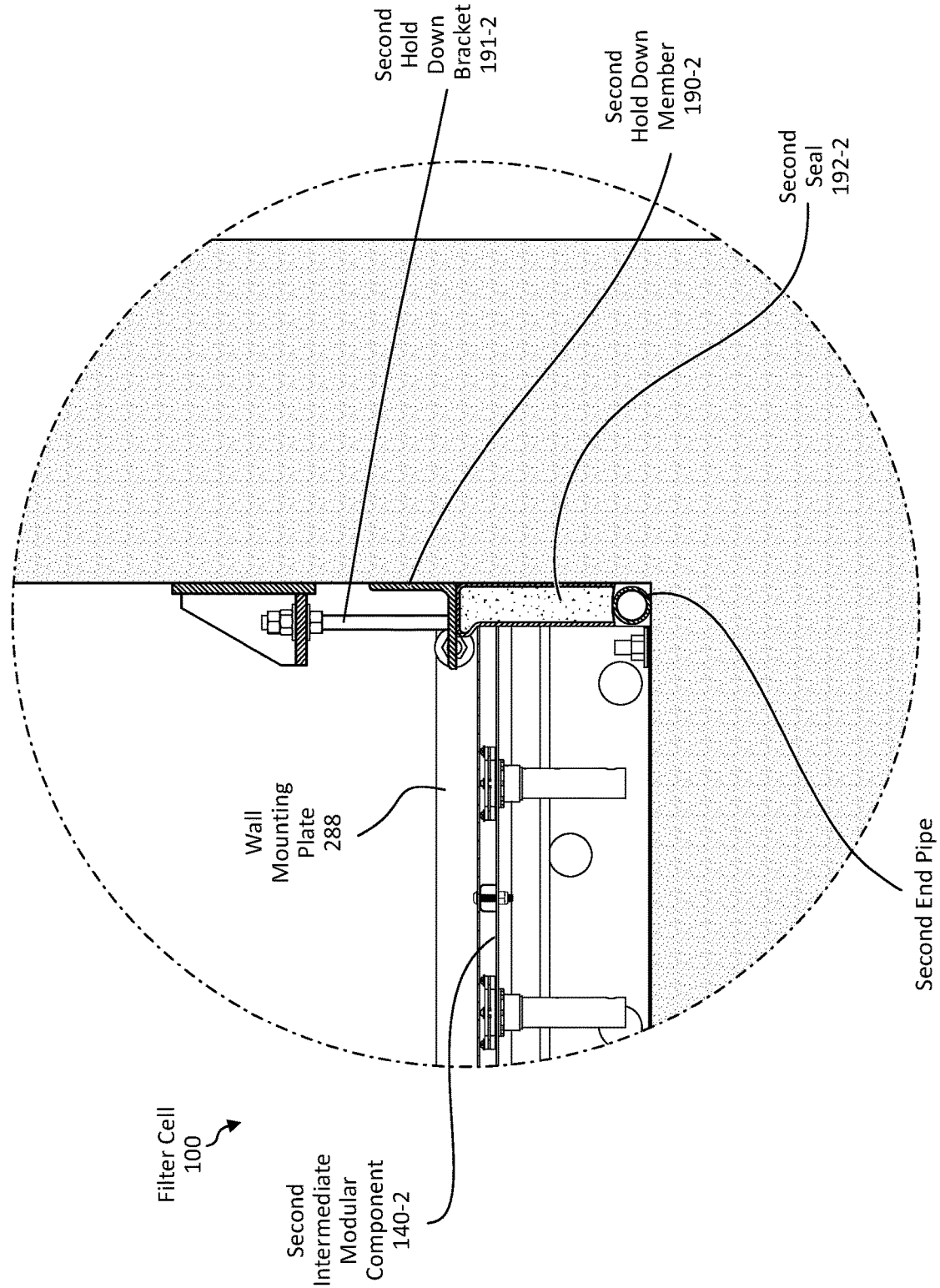
FIG. 12B is an enlarged view of the region 12B shown in FIG. 12A.
Figure 12C:
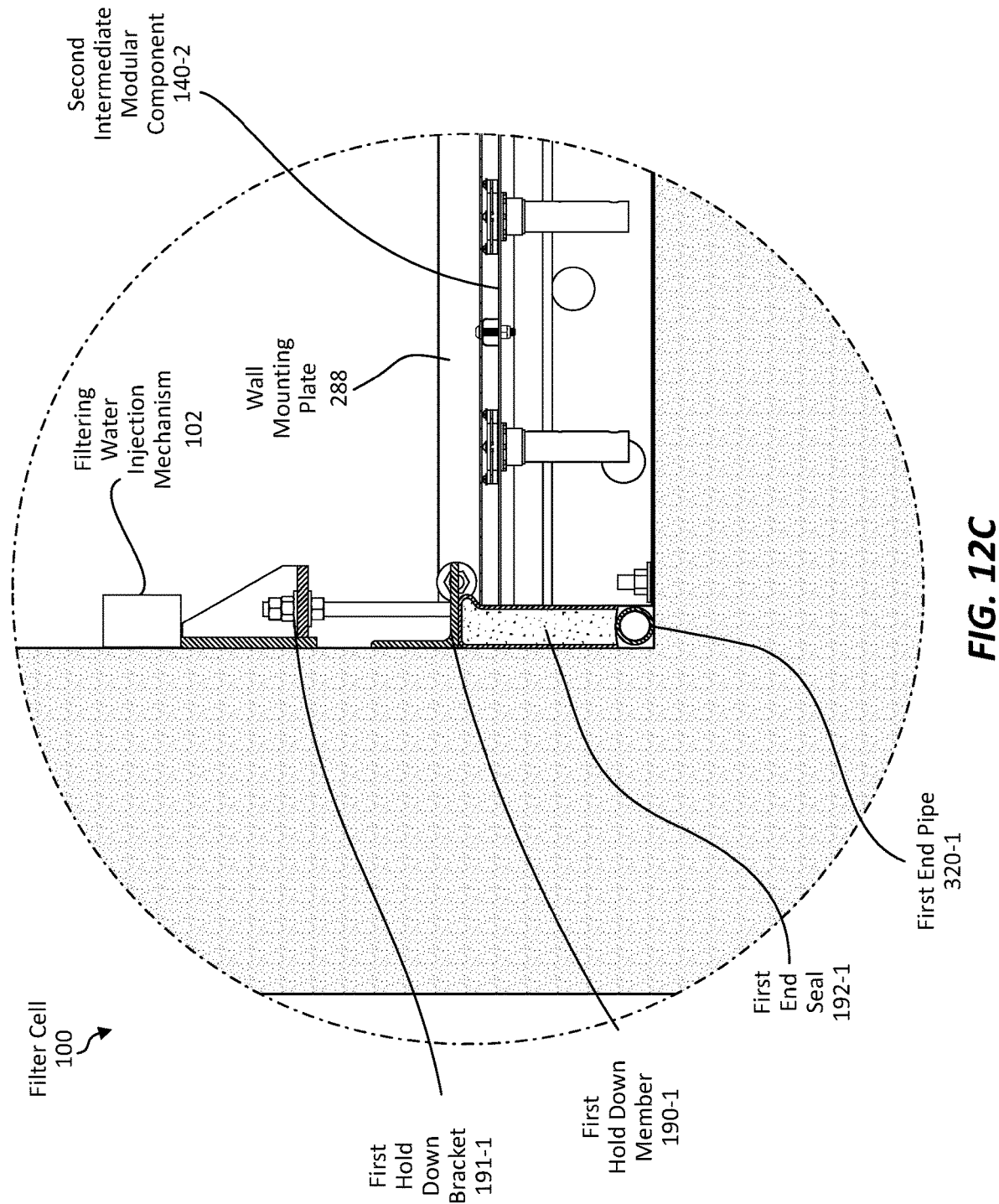
FIG. 12C is an enlarged view of the region 12C shown in FIG. 12A.

FIGS. 12A-12C comprise various cross-sectional views of the filter cell 100 shown in FIG. 3 taken across a length dimension 120 of the filter cell 100. More specifically, the cross-sectional view is taken across the second intermediate modular component 140-2 of the modular underdrain system 112. As discussed previously, the filter cell 100 comprises a depth dimension 116, a width dimension 118, and a length dimension 120. The filter cell 100 and the modular underdrain system 112 in FIGS. 12A-12C are shown in an installed state.

In these figures, a wall mounting plate 288 of a starter strip 95 is illustrated. In addition, one embodiment of an air injection mechanism 103 at least partially positioned within a flume 147 is also illustrated. One embodiment of a filtering water injection mechanism 102 is also illustrated.

A first end seal 192-1 and a first end pipe 320-1 are positioned at one end of the modular underdrain system 112, and a second end seal 192-2 and a second end pipe 320-2 at an opposite end of the modular underdrain system 112 along the length dimension 120. The first end seal 192-1 and second end seal 192-2 may be formed of grout, gasket or any other mechanism capable of forming a media-tight seal with the starter strip 95, intermediate modular components 140 and the previously illustrated terminating modular component 140c. The first end pipe 320-1 and the second end pipe 320-2 comprise conduits that may serve as spacers that mitigate displacement of the first end seal 192-1 and the second end seal 192-2 along a depth dimension 116. The first end seal 192-1 and the first end pipe 320-1 are held in place by a first hold down member 190-1 and a set of one or more first hold down brackets 191-1. The second end seal 192-2 and the second end pipe 320-2 are held in place by a second hold down member 190-2 and a set of one or more second hold down brackets 191-2.

FIGS. 13A-13B comprise various views of one embodiment of a hold down member 190 for use in a modular underdrain system 112. As illustrated, the hold down member 190 has an L-shaped side profile. In alternative embodiments, for example, the hold down member 190 may have a U-shaped, an I-shaped, a rectangular-shaped, or a square-shaped side profile.

Figure 14A:
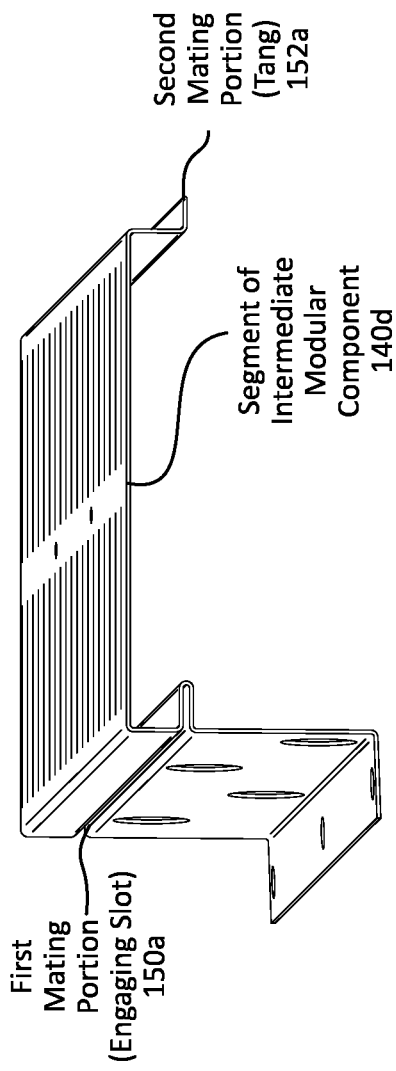
FIG. 14A is a top perspective view of a segment of an alternative embodiment of an intermediate modular component.

FIG. 14A is a top perspective view of a segment of an alternative embodiment of an intermediate modular component 140d. As indicated previously, the term "segment" indicates that only a portion along a length dimension of the alternative embodiment of the intermediate modular component 140d is illustrated. In practice, the alternative embodiment of the intermediate modular component may be shorter or greater along a length dimension than the illustrated segment of the alternative embodiment of the intermediate modular component 140d. The illustrated alternative embodiment includes a different version of a first mating portion 150a and a second mating portion 152a. The first mating portion 150a may comprise an engaging slot shaped, sized, and positioned for engagement with the second mating portion 152a, which may comprise a tang.

Figure 14B:
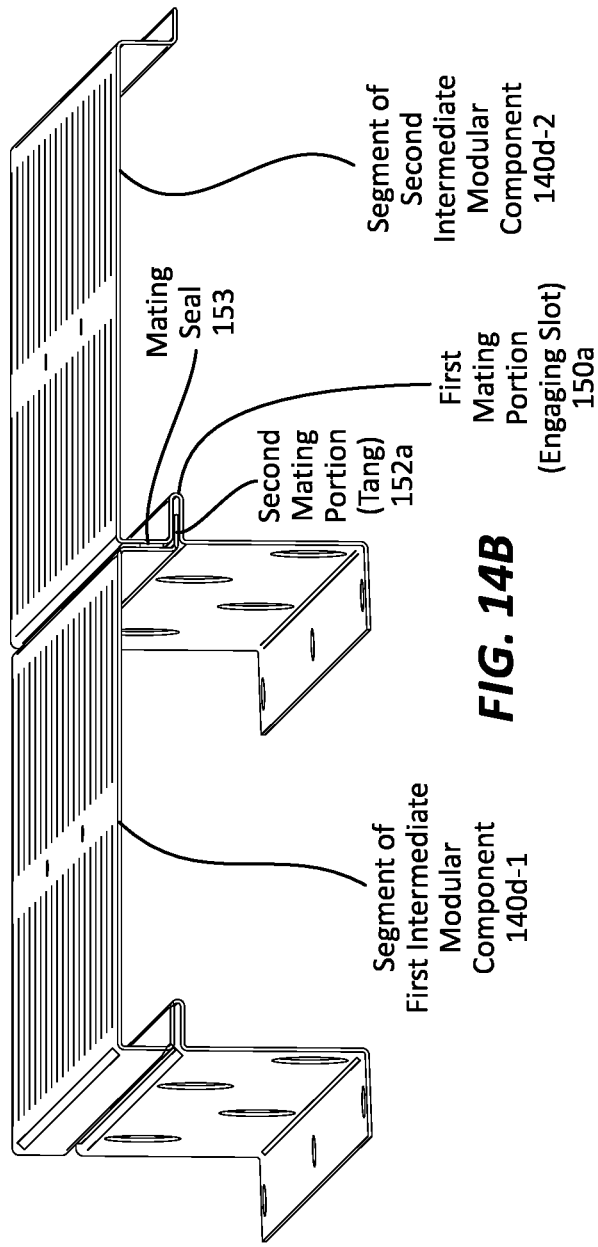
FIG. 14B is a top perspective view showing two segments of the alternative embodiment of the intermediate modular component of FIG. 14A shown in mating engagement.

FIG. 14B is a top perspective view showing two segments of the alternative embodiment of the intermediate modular component 140d-1, 140d-2 of FIG. 14A shown in engagement. As illustrated, a second mating portion 152a of a segment of the first intermediate modular component 140d-1 is shown engaged with a first mating portion 150a of a segment of the second intermediate modular component 140d-2. In addition, a mating seal 153 is positioned between the segment of the first intermediate modular component 140d-1 and the segment of the second intermediate modular component 140d-2. In alternative embodiments, the mating seal 153 may be located at different positions, such as on one side of the second mating portion 152a and adjacent to the first mating portion 150a. Also, it should be noted that in connection with all embodiments, multiple mating seals may be used for a first mating portion and a second mating portion. As indicated previously, the first mating portion and second mating portion may be configured in various ways to enable mutual engagement.

Figure 15:
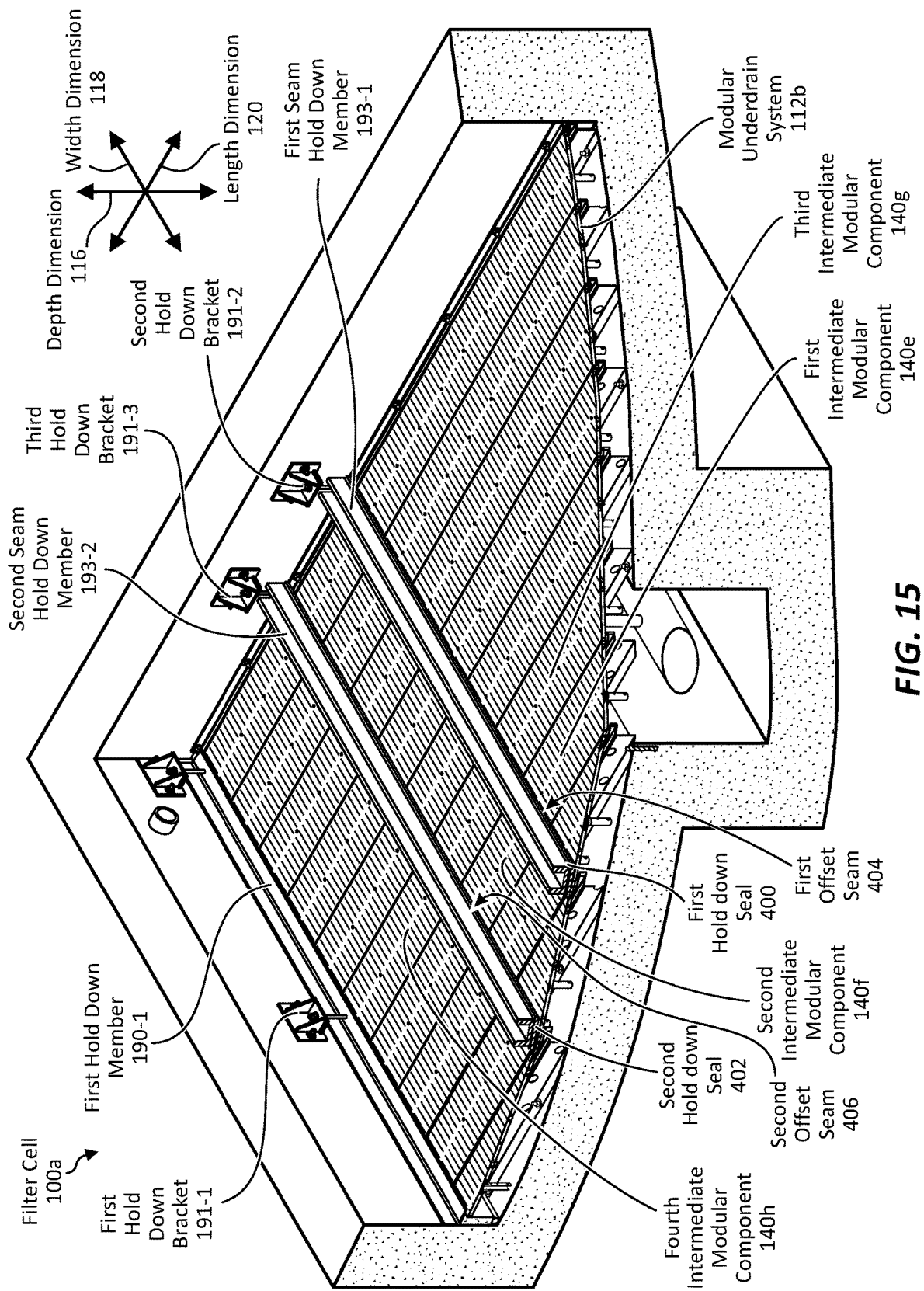
FIG. 15 is a partial cross-sectional view of one embodiment of a filter cell including two or more adjacently positioned intermediate modular components along a length dimension.

FIG. 15 is a partial cross-sectional view of one embodiment of a filter cell 100a including an alternative embodiment of a modular underdrain system 112b. As indicated previously, a filter cell 100a may comprise a depth dimension 116, a width dimension 118 and a length dimension 120. The illustrated modular underdrain system 112b may include two or more adjacently positioned intermediate modular components 140e-h along a length dimension 120. Further, the illustrated filter cell 100a also includes first and second offset seams 404, 406. In particular, a first intermediate modular component 140e is positioned adjacent to a second intermediate modular component 140f at a first offset seam 404. A third intermediate modular component 140g is positioned adjacent to a fourth intermediate modular component 140h at a second offset seam 406. The first and second offset seams 404, 406 are offset along the length dimension 120 of the filter cell 100.

In addition to the first hold down member 190-1 and the first hold down bracket 191-1, the modular underdrain system 112b includes a first seam hold down member 193-1 positioned over the first offset seam 404 (with at least one second hold down bracket 191-2 for retaining the first seam hold down member 193-1 in position), and a second seam hold down member 190b positioned over the second offset seam 406 (with at least one third hold down bracket 191-3 for retaining the second seam hold down member 193-2 in position). In addition, a first hold down seal 400 may be interposed between the first seam hold down member 193-1 and the first offset seam 404, and a second hold down seal 402 may be interposed between the second seam hold down member 193-2 and a second offset seam 406 to prevent or mitigate leakage through the seams 404, 406.

It should be noted that the position of offset seams 404, 406 may alternate in consecutive modular components along the width dimension 118 between a seam disposed underneath the first seam hold down member 193-1 and the second seam hold down member 193-2. In alternative embodiments, all of the seams are disposed underneath a single hold down member 193-1, obviating the need for a second seam hold down member 193-2.

Also, additional hold down brackets may be employed at opposing ends of the first seam hold down member 193-1 and the second seam hold down member 193-2, which are not visible in this figure. In addition, fasteners (not shown) with one or more fastener seals or caulking may be utilized to maintain the first seam hold down member 193-1 and the second seam hold down member 193-2 in place.

The foregoing disclosure and associated figures provide only examples of the disclosed and claimed subject matter. Limitations associated with the description and figures are not to be imputed to the claims. For example, in various alternative embodiments, the first peripheral side 144 and the second peripheral side portion 146 are equal in length along the depth dimension 116a. In yet other alternative embodiments, the second peripheral side 144 is greater in length than the first peripheral side 146 along the depth dimension 116a. In addition, a modular component 140, 140a-h may comprise one or multiple metering pipes. Also, each of the one or more upper transfer orifices 156, lower transfer orifices 158, proximal orifices 176, and remote orifices 178 may have various shapes, such as circular, elongated, round, in the shape of a slot, elliptical, octagonal, square, or rectangular. In various embodiments, the modular component chamber 142 is sealed such that fluid (e.g., air 128 and/or water 130) may enter and exit the modular component chamber 142 only through the slots 210 and through the metering pipe 170 during normal operating conditions of the modular underdrain system 112 when the modular underdrain system 112 is in an installed state. As used herein, a "modular component," in singular or plural form, encompasses at least intermediate modular components 140, 140a-h, starter strips 95, and terminating modular components 140c. Thus, an "adjacent modular component," in singular or plural form, encompasses at least an adjacent intermediate modular component 140, 140a-h, an adjacent starter strip 95, and an adjacent terminating modular component 140c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed.

What is claimed is:

1. A modular underdrain system for use in a filter cell for filtering water, the filter cell comprising a filter chamber including filter media separated from an underdrain chamber by the modular underdrain system, the filter cell further comprising a water injection mechanism for inputting water to be filtered into the filter chamber and water and air injection mechanisms for inputting cleaning water and air into the underdrain chamber, the modular underdrain system comprising a plurality of modular components, each of the plurality of modular components comprising a depth dimension, a width dimension, and a length dimension, at least one of the plurality of modular components comprising an intermediate modular component, the intermediate modular component comprising:

a first peripheral side and a second peripheral side, the first peripheral side being opposite the second peripheral side along the width dimension, the first peripheral side comprising a first mating portion, and the second peripheral side comprising a second mating portion, the second mating portion being sized and shaped to engage with a first mating portion of an adjacent modular component;

the first peripheral side comprising at least one transfer orifice;

a modular component chamber bounded by an underdrain floor side and an internal side, the underdrain floor side being offset from at least a portion of the internal side along the depth dimension, the underdrain floor side comprising a plurality of slots, the internal side comprising a metering pipe opening; and a metering pipe sized to be positioned within the metering pipe opening, the metering pipe comprising a distributor head for positioning within the modular component chamber and an outside portion for positioning outside of the modular component chamber, the outside portion of the metering pipe comprising a set of one or more proximate orifices and a set of one or more remote orifices, the set of one or more proximate orifices being disposed closer to the modular component chamber along the depth dimension than the set of one or more remote orifices.

2. The intermediate modular component of claim 1, wherein the at least one transfer orifice comprises a first transfer orifice and a second transfer orifice, the first transfer orifice and the second transfer orifice being offset along the depth dimension.

3. The intermediate modular component of claim 2, wherein the modular component chamber comprises a first subchamber separated by a baffle from a second subchamber, the baffle limiting fluid flow between the first subchamber and the second subchamber.

4. The intermediate modular component of claim 3, further comprising a second metering pipe disposed at least partially within the second subchamber, the metering pipe being at least partially disposed within the first subchamber.

5. The intermediate modular component of claim 4, further comprising a second baffle spaced apart from the baffle along the length dimension of the intermediate modular component.

6. The intermediate modular component of claim 5, wherein, when the modular underdrain system is in an installed state, the modular component chamber has a modular component chamber cross-sectional area bounded by the internal side and the underdrain floor side, and the intermediate modular component has an underdrain chamber cross-sectional area bounded by the internal side, the first peripheral side, a substrate to which the first peripheral side is attached, the second peripheral side, and a first peripheral side of the adjacent modular component, the modular component chamber cross-sectional area being 6% to 25% of the underdrain chamber cross-sectional area.

7. The intermediate modular component of claim 6, wherein a depth dimension of the first peripheral side is greater than a depth dimension of the second peripheral side.

8. The intermediate modular component of claim 7, wherein the first peripheral side comprises a foot for securing the intermediate modular component to the substrate.

9. The intermediate modular component of claim 8, further comprising a seal member positioned between the first mating portion and the second mating portion of the adjacent modular component.

10. The intermediate modular component of claim 9, wherein the set of one or more remote orifices comprises a remote end orifice disposed at an end of the metering pipe most remote from the modular component chamber.

11. A modular underdrain system comprising a plurality of modular components, each of the plurality of modular components comprising a depth dimension, a width dimension, and a length dimension, the plurality of modular components comprising at least one intermediate modular component, the intermediate modular component comprising:
  a first peripheral side and a second peripheral side, the first peripheral side being opposite the second peripheral side along the width dimension, the first peripheral side comprising a first mating portion, and the second peripheral side comprising a second mating portion, the second mating portion being sized and shaped to engage with a first mating portion of an adjacent modular component;
  the first peripheral side comprising at least one transfer orifice;
  a modular component chamber bounded by an underdrain floor side and an internal side, the underdrain floor side being offset from at least a portion of the internal side along the depth dimension, the underdrain floor side comprising a plurality of slots, the internal side comprising a metering pipe opening; and
  a metering pipe sized to be positioned within the metering pipe opening, the metering pipe comprising a distributor head for positioning within the modular component chamber and an outside portion for positioning outside of the modular component chamber, the outside portion of the metering pipe comprising a set of one or more proximate orifices and a set of one or more remote orifices, the set of one or more proximate orifices being disposed closer to the modular component chamber along the depth dimension than the set of one or more remote orifices.

12. The intermediate modular component of claim 11, wherein the second mating portion comprises a tang, and the first mating portion of the adjacent modular component comprises an engaging slot.

13. The intermediate modular component of claim 11, wherein the at least one transfer orifice comprises a first transfer orifice and a second transfer orifice, the first transfer orifice and the second transfer orifice being offset along the depth dimension.

14. The intermediate modular component of claim 11, wherein the modular component chamber comprises a first subchamber separated by a baffle from a second subchamber, the baffle limiting fluid flow between the first subchamber and the second subchamber.

15. The intermediate modular component of claim 11, wherein, when the modular underdrain system is in an installed state, the modular component chamber has a modular component chamber cross-sectional area bounded by the internal side and the underdrain floor side, and the intermediate modular component has an underdrain chamber cross-sectional area bounded by the internal side, the first peripheral side, a substrate to which the first peripheral side is attached, the second peripheral side, and a first peripheral side of the adjacent modular component, the modular component chamber cross-sectional area being 6% to 25% of the underdrain chamber cross-sectional area.

16. A modular underdrain system comprising at least a first and a second intermediate modular component, the first and the second intermediate modular components each comprising a depth dimension, a width dimension, and a length dimension, each of the first and second intermediate modular components comprising:
  a first peripheral side and a second peripheral side, the first peripheral side being opposite the second peripheral side along the width dimension, the first peripheral side comprising a first mating portion and the second peripheral side comprising a second mating portion, the second mating portion being sized and shaped to engage with a first mating portion of an adjacent modular component;
  the first peripheral side comprising at least one transfer orifice;
  a modular component chamber bounded by an underdrain floor side and an internal side, the underdrain floor side being offset from at least a portion of the internal side along the depth dimension, the underdrain floor side comprising a plurality of slots, the internal side comprising a metering pipe opening; and
  a metering pipe sized to be positioned within the metering pipe opening, the metering pipe comprising a distributor head for positioning within the modular component chamber and an outside portion for positioning outside of the modular component chamber, the outside portion of the metering pipe comprising a set of one or more proximate orifices and a set of one or more remote orifices, the set of one or more proximate orifices being disposed closer to the modular component chamber along the depth dimension than the set of one or more remote orifices, wherein when the first mating portion of the first intermediate modular component is engaged with the second mating portion of the second intermediate modular component a combination of the underdrain floor side of the first intermediate modular component and the underdrain floor side of the second intermediate modular component define a substantially flat surface.

17. The modular underdrain system of claim 16, further comprising a hold down member positioned on or adjacent to the substantially flat surface.

18. The modular underdrain system of claim 17, further comprising a terminating modular underdrain component devoid of transfer orifices for engaging with the second intermediate modular component.

19. The modular underdrain system of claim 18, further comprising a starter strip for engaging with a third intermediate modular component.

\* \* \* \* \*